(12) United States Patent
Gleason et al.

(10) Patent No.: US 10,519,326 B2
(45) Date of Patent: Dec. 31, 2019

(54) ANTIFOULING AND CHLORINE-RESISTANT ULTRATHIN COATINGS ON REVERSE OSMOSIS MEMBRANES

(71) Applicants: Karen K. Gleason, Cambridge, MA (US); Rong Yang, Cambridge, MA (US)

(72) Inventors: Karen K. Gleason, Cambridge, MA (US); Rong Yang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1417 days.

(21) Appl. No.: 14/246,858

(22) Filed: Apr. 7, 2014

(65) Prior Publication Data
US 2014/0299538 A1 Oct. 9, 2014

Related U.S. Application Data

(60) Provisional application No. 61/808,880, filed on Apr. 5, 2013.

(51) Int. Cl.
| | | |
|---|---|---|
| *C09D 5/16* | (2006.01) | |
| *B01D 65/08* | (2006.01) | |
| *C09D 139/08* | (2006.01) | |
| *B01D 61/02* | (2006.01) | |
| *B01D 67/00* | (2006.01) | |

(52) U.S. Cl.
CPC .......... *C09D 5/1668* (2013.01); *B01D 65/08* (2013.01); *B01D 67/0088* (2013.01); *C09D 139/08* (2013.01); *B01D 61/025* (2013.01)

(58) Field of Classification Search
None
See application file for complete search history.

(56) References Cited

U.S. PATENT DOCUMENTS

| | | | | |
|---|---|---|---|---|
| 3,759,738 A | * | 9/1973 | Misumi et al. | ........ B01D 69/10 427/552 |
| 4,594,392 A | * | 6/1986 | Hatch | .................... A01N 59/00 525/327.1 |
| 5,164,424 A | * | 11/1992 | Brueschke | ......... B01D 67/0093 210/640 |
| 2003/0198825 A1 | * | 10/2003 | Mayes | ............... B01D 67/0011 428/522 |
| 2005/0242032 A1 | | 11/2005 | Sugito et al. | |
| 2010/0080841 A1 | | 4/2010 | Porbeni et al. | |

OTHER PUBLICATIONS

International Search Report dated Mar. 2, 2015, from PCT/US14/33194.

(Continued)

*Primary Examiner* — Krishnan S Menon
*Assistant Examiner* — Brad Gordon
(74) *Attorney, Agent, or Firm* — Foley Hoag LLP

(57) ABSTRACT

Disclosed are methods of preparing antifouling and chlorine-resistant coatings on reverse osmosis membranes with initiated chemical vapor deposition. The coatings enhance the stability and lifetime of membranes without sacrificing performance characteristics, such as permeability or salt retention.

11 Claims, 18 Drawing Sheets

(56) References Cited

OTHER PUBLICATIONS

Yang et al., "Surface-Tethered Zwitterionic Ultrathin Antifouling Coatings on Reverse Osmosis Membranes by Initiated Chemical Vapor Deposition," Chemistry of Materials, 23:1263-1272 (2011).
Yang et al., "Ultrathin Antifouling Coatings with Stable Surface Zwitterionic Functionality by Initiated Chemical Vapor Deposition (iCVD)," Langmuir., 28(33):12266-12274 (2012).

* cited by examiner

Figure 6

| Methods | SAMs | Atom-transfer radical- polymerization | Grafting- from | Grafting-to | Bulk solution polymerization | LbL | iCVD |
|---|---|---|---|---|---|---|---|
| Substrate-independence | No | No | No | No | Yes | No | Yes |
| nm- to μm-scale thickness | No | No | No | No | No | Yes | Yes |
| All-dry processing | No | No | No | No | No | No | Yes |
| Conformal coating | Yes | Yes | Yes | Yes | No | Yes | Yes |
| Small post-treatment roughness | Yes | Yes | Yes | Yes | No | No | Yes |
| High surface concentration of zwitterionic groups | Yes | Yes | Yes | No | No | Yes | Yes |
| Synthesis speed (nm/min) | $10^{-3}$ | $10^{-2}$ | | | $\sim 10^3$ | $\sim 1$ | $\sim 10$ |

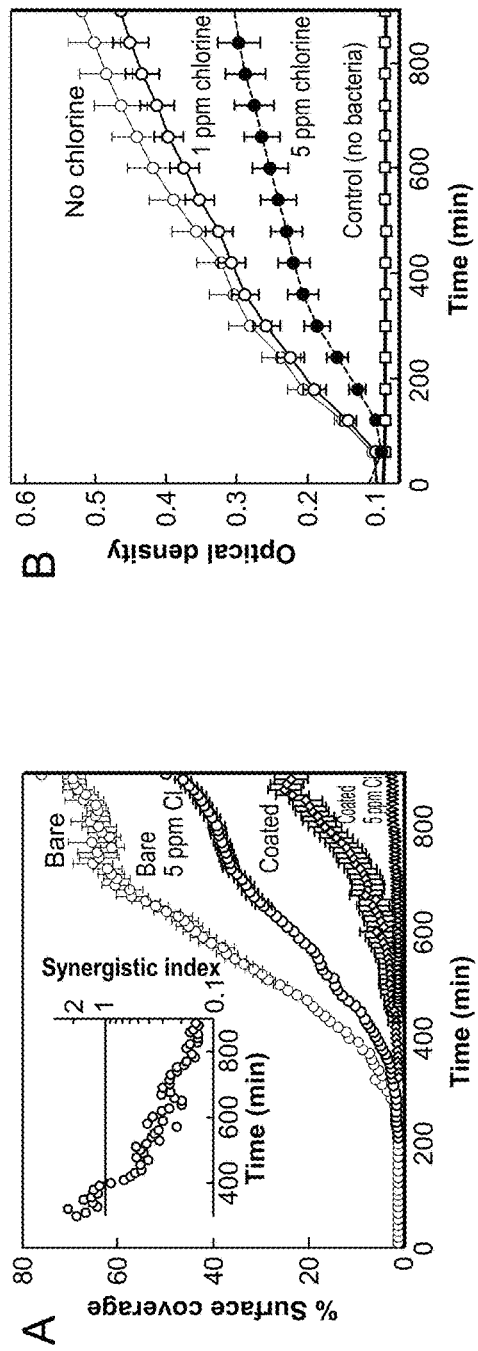
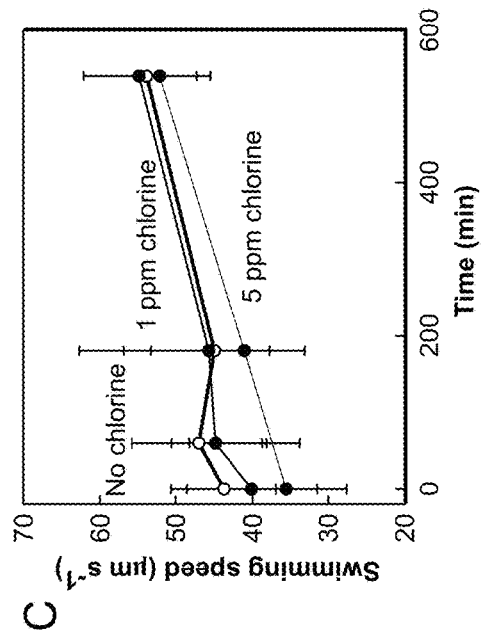
FIG. 11

ANTIFOULING AND CHLORINE-RESISTANT ULTRATHIN COATINGS ON REVERSE OSMOSIS MEMBRANES

RELATED APPLICATIONS

This application claims the benefit of priority to U.S. Provisional Patent Application Ser. No. 61/808,880, filed Apr. 5, 2013; the contents of which are hereby incorporated by reference.

BACKGROUND OF THE INVENTION

Fouling refers to the undesirable attachment of organic matter, biomolecules, and microbes on submerged surfaces. Fouling diminishes the performance of devices involving these submerged surfaces and is considered the bottle-neck issue for various applications in the biomedical industry, food processing, and water treatment, especially in reverse osmosis (RO) desalination. Nearly all RO desalination operations use thin-film composite (TFC) membranes due to their excellent salt rejection, low energy cost, and reasonable permeability. However, the surface properties of TFC membranes render them prone to fouling. Fouling reduces permeability and salt rejection ability, and shortens membrane lifetime significantly. Fouling can be reduced or even prevented if chlorine or other oxidizing agents are added to the feed. However, the salt-rejection layer in TFC membranes is polyamide, which is very susceptible to oxidation. Thus, continuous exposure to water containing even a few parts per billion (ppb) chlorine degrades membrane performance significantly. To meet these conflicting requirements, water to be purified is often chlorinated for disinfection purposes, de-chlorinated before entering membrane desalination units, and re-chlorinated after permeating through the membranes. The poor chlorine resistance of TFC membranes leads to significant additional processing steps and, in turn, increases operational costs. Therefore, the prevention of fouling and chlorine oxidation has been identified as the core means to improve the energy usage and reliability of sea water desalination.

Fouling can be reduced by membrane surface modification. Coatings become ineffective once the first layer of foulant forms on the surface and, therefore, extraordinary resistance to fouling or ultra-low fouling is desired. Among the antifouling surface chemistries poly(ethylene glycol) (PEG) brushes are the "gold standard." However, the poor long-term stability of PEG has been a concern and the unique brush morphology, which is necessary for the ultra-low fouling resistance, is not achievable on all substrates. These largely limit the application of PEG, and reduce its antifouling performance in real-world applications. Zwitterionic chemistry has similar fouling resistance as PEG. Although the betaine structure does not involve unstable bonds (such as ether in PEG), the zwitterionic antifouling polymers are fabricated almost exclusively with acrylate monomers having a relatively labile ester bond that does not stand up to oxidizing agents, such as chlorine.

In addition, current coating techniques (FIG. 6) for zwitterionic chemistry are not substrate-independent and usually involve organic solvents. Coatings made by these methods suffer from surface defects (such as pin-holes) resulting from de-wetting and surface tension effects. In addition, solvent-based techniques can damage delicate substrates, such as RO membranes. A vapor phase deposition method can avoid the potential for this damage by solvents during the surface modification of such membranes.

There exists a need for an efficient, reliable, environmental-friendly, solvent-less method of depositing chlorine-resisting antifouling coatings on reverse osmosis membranes.

SUMMARY OF THE INVENTION

In certain embodiments, the invention relates to a polymer, wherein the polymer comprises a first repeat unit and a second repeat unit;
the first repeat unit is

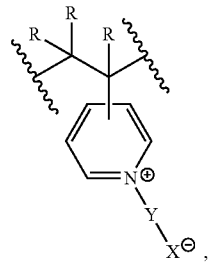

wherein, independently for each occurrence,
R is H, alkyl, halo, hydroxy, amino, nitro, or cyano;
Y is a linker that does not comprise an amide bond, an ester bond, or an ether bond; and
$X^{\ominus}$ is $-SO_3^{\ominus}$, $-HPO_3^{\ominus}$, or $-CO_2^{\ominus}$;
the second repeat unit is

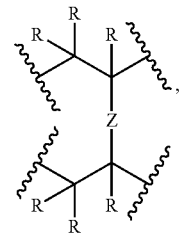

wherein, independently for each occurrence,
R is H, alkyl, halo, hydroxy, amino, nitro, or cyano; and
Z is a linker that does not comprise an amide bond, an ester bond, or an ether bond.

In certain embodiments, the invention relates to a composition, wherein the composition comprises a substrate and a coating material, wherein the coating material comprises any one of the aforementioned polymers.

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with any one of the aforementioned polymers.

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with a polymer comprising a second repeat unit and a third repeat unit, wherein the second repeat unit is

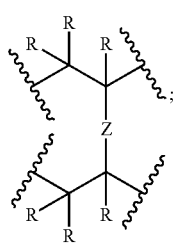

the third repeat unit is

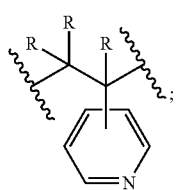

R is H, alkyl, halo, hydroxy, amino, nitro, or cyano; and Z is a linker that does not comprise an amide bond, an ester bond, or an ether bond, thereby producing a pyridine-coated substrate.

In certain embodiments, the invention relates to an article comprising any one of the aforementioned compositions.

BRIEF DESCRIPTION OF THE FIGURES

FIG. 6 tabulates various important characteristics of surface modification techniques for zwitterionic chemistry.

FIG. 11 depicts the synergistic prevention of bacterial fouling by the combination treatment. a, Surface coverage by *V. cyclitrophicus* bacteria under different conditions. The synergistic treatment—integrating iCVD zwitterionic coating with low-level (5 ppm) chlorination—shows exceptional long-term antifouling activity even under accelerated biofouling conditions (i.e., dense bacterial suspensions), when each method in isolation begins to fail. Inset, Time series of the synergistic index (S), quantifying synergistic effect of the two antifouling strategies. Values of S<1 indicate a positive synergy between the two treatments. The monotonic decrease of S, with no signs of saturation over 15 hours, demonstrates the importance of synergistic effect on long-term fouling resistance. b, Viability of *V. cyclitrophicus* upon addition of chlorine at different concentrations. One ppm chlorine does not significantly impact bacterial growth, whereas 5 ppm chlorine reduces the optical density by 42%, but does not kill bacteria. Killing by chlorine is not the dominant factor in the success of the synergistic treatment. c, Mean swimming speed of *V. cyclitrophicus*, obtained by tracking of individual cells. Addition of up to 5 ppm chlorine does not significantly change the bacteria's swimming speed, suggesting that prevention of attachment is not due to a reduction of encounters with surfaces.

remains clean, with 0% surface coverage. The relative fouling index $F_1$, defined as the fraction of surface coverage for the coated surface compared to the bare glass control, decreases steadily over the course of the test. After 300 minutes, $F_1$ reaches ~$10^{-2}$, corresponding to ~100 times improved fouling resistance of the functionalized copolymer 1 surface compared to the bare glass surface.

Figure 16:
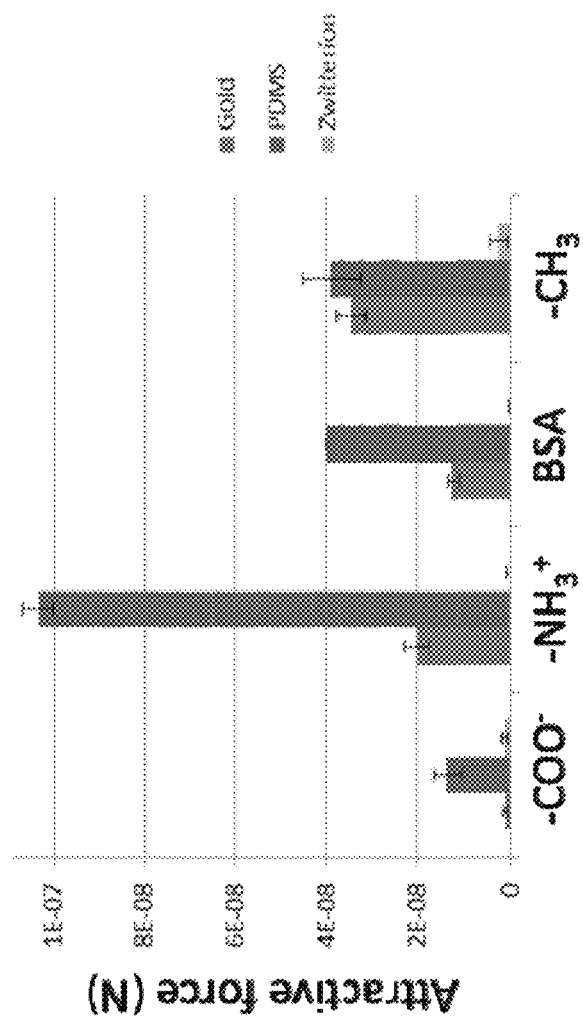

FIG. 16 depicts attractive force (N) between AFM tips functionalized with specific moieties and iCVD zwitterionic thin films in comparison with control surfaces, as measured with MFP.

Figure 17:
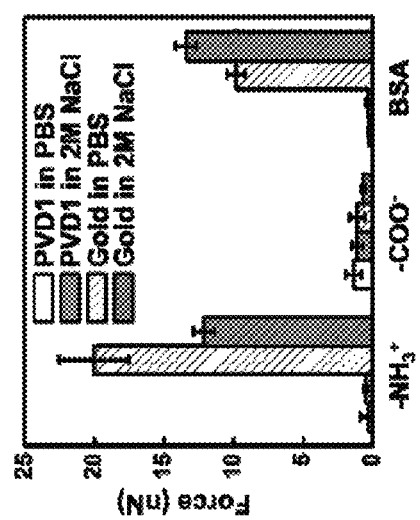

FIG. 17 depicts MFP results of iCVD zwitterionic surface (denoted as PVD1) and gold under low- and high-salinity conditions.

Figure 18:
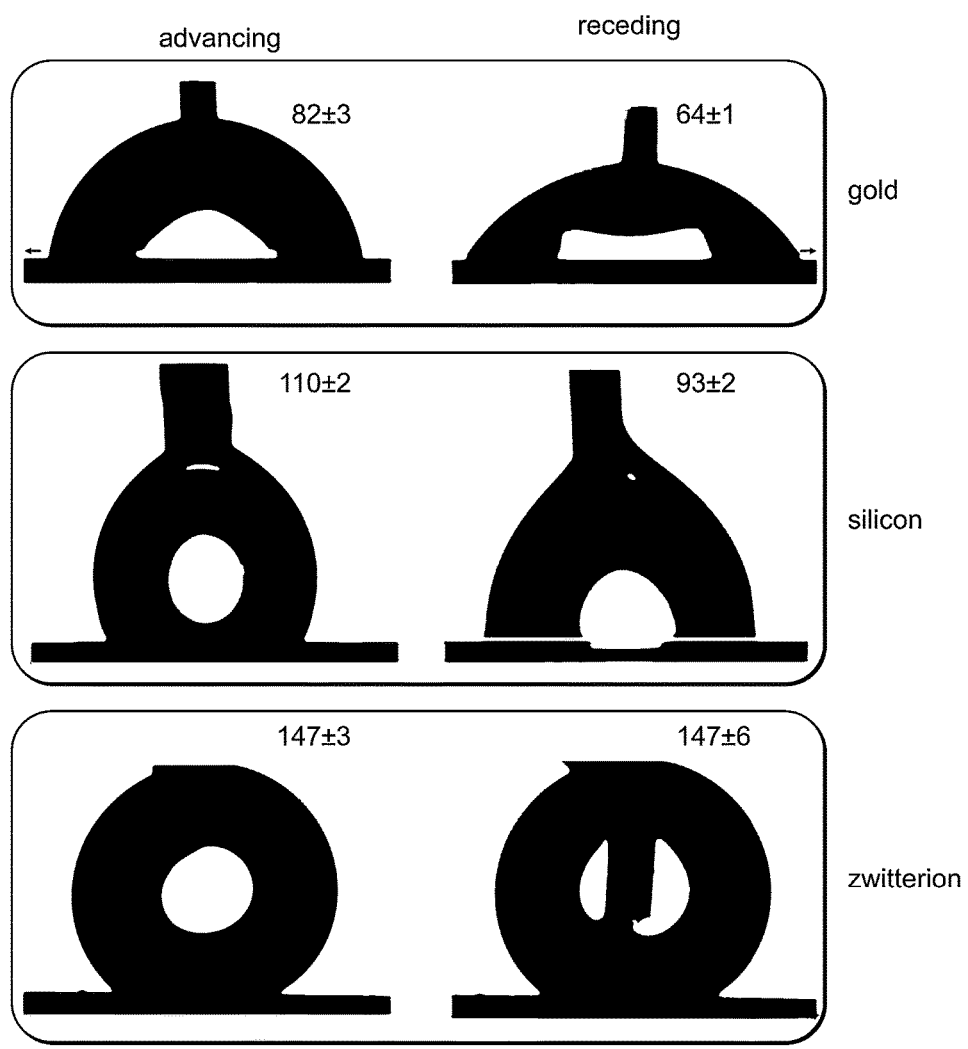

FIG. 18 depicts the underwater contact angle of gold, silicon, and zwitterionic surfaces.

Figure 19:
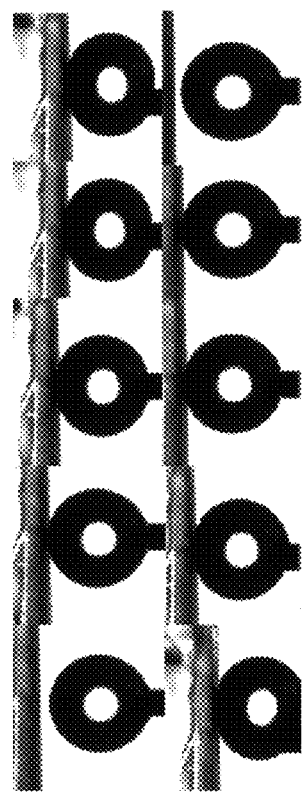

FIG. 19 depicts a series of images of a mineral oil droplet when it is brought into contact with a rough surface modified with iCVD pyridine-based zwitterionic coating.

DETAILED DESCRIPTION OF THE INVENTION

Overview

In certain embodiments, the invention relates to the solventless preparation of controllably cross-linked poly(4-vinylpyridine) (P4VP) and poly(4-vinylpyridine-co-divinylbenzene) thin films using initiated Chemical Vapor Deposition (iCVD). In certain embodiments, pyridine repeat units in iCVD films are subject to functionalization by 1,3-propanesultone (PS) and converted to zwitterionic structures, which are fouling resistant. Pyridine-based zwitterionic structures do not contain the labile ether and ester bonds commonly found in zwitterionic films; so, these films are stable in strong oxidative environments, such as bleach. In certain embodiments, the chlorine-resistant, antifouling coatings prepared by a solventless procedure are useful in the water desalination industry. In certain embodiments, the films are applied to reverse osmosis (RO) desalination membranes. In certain embodiments, the salt rejection properties of the RO membranes remain the same after the modification, indicating this mild process does not affect the extremely delicate semipermeable layer. In certain embodiments, permeability to water is affected only slightly by the coating. In certain embodiments, tunable crosslinking density gives rise to adjustable water permeability and chlorine resistance. In certain embodiments, films having 4% DVB repeat units display chlorine resistance while maintaining high water flux. In certain embodiments, the chlorine resistance of the coating is superior to commercial RO membranes.

In certain embodiments, the invention relates to an antifouling coating that is also chlorine-resistant. The coating may derive from poly(4-vinylpyridine) (P4VP), which has been used as the precursor for antimicrobial coatings. In certain embodiments, quaternization is performed on P4VP to obtain a positively-charged surface that is able to penetrate and degrade cell membranes of various microbes. However, the surface charge induces attachment of proteins and microbes with the opposite charge, and these species can remain on the surface and diminish the surface antimicrobial activity. So, the P4VP is reacted with 1,3-propane sultone to obtain a zwitterionic chemistry with balanced surface charge. Remarkably, poly(4-vinylpyridine propylsulfobetaine) (P4VPPS, CAS Registry Number: 4271-44-7) has been discovered to be fouling-resistant, and systematic studies have been carried out to characterize the antifouling properties of this chemistry. Divinylbenzene (DVB) copolymerizes with 4VP and renders the copolymer resistant to oxidation by chlorine.

In certain embodiments, ultrathin P4VP coatings are deposited on commercially available TFC membranes via initiated chemical vapor deposition (iCVD), a vapor phase deposition technique, followed by a vapor phase derivatization by 1,3-propanesultone (PS) to obtain pyridine-based sulfobetaine. In certain embodiments, the vapor-phase deposition and derivatization of P4VP enables surface modification of delicate substrates, such as RO membranes. In certain embodiments, the invention relates to quaternization by PS in the vapor phase. In certain embodiments, since surface tension and de-wetting are avoided, the all-dry process conforms to the geometry of the underlying substrate. In addition, the benign reaction conditions allow full retention of functionalities. In certain embodiments, the substrate-independent method is time-efficient and scalable to industrial scale roll-to-roll infrastructure. In certain embodiments, multiple substrates can be coated simultaneously.

In certain embodiments, the iCVD synthesis is carried out at low surface temperature (20° C.) to produce robustly adhered, smooth, ultrathin layers (30 nm) directly on even delicate substrates, such as TFC-RO membranes without damaging them.

In certain embodiments, the inventive compositions show ~100-fold reduction in biofouling on the coated surface compared to bare glass when exposed to marine bacteria in an accelerated test. The unique resistance of the pyridine-based films against degradation by chlorine allows a synergistic approach to antifouling, which substantially enhances longer-term fouling prevention compared to either surface modification or chlorination alone, and has the potential to reduce or eliminate pretreatment of seawater, the most energy- and chemical-intensive step in desalination plants, and thus to reduce the cost of freshwater production and its collateral toxicity to marine biota.

Figure 1:
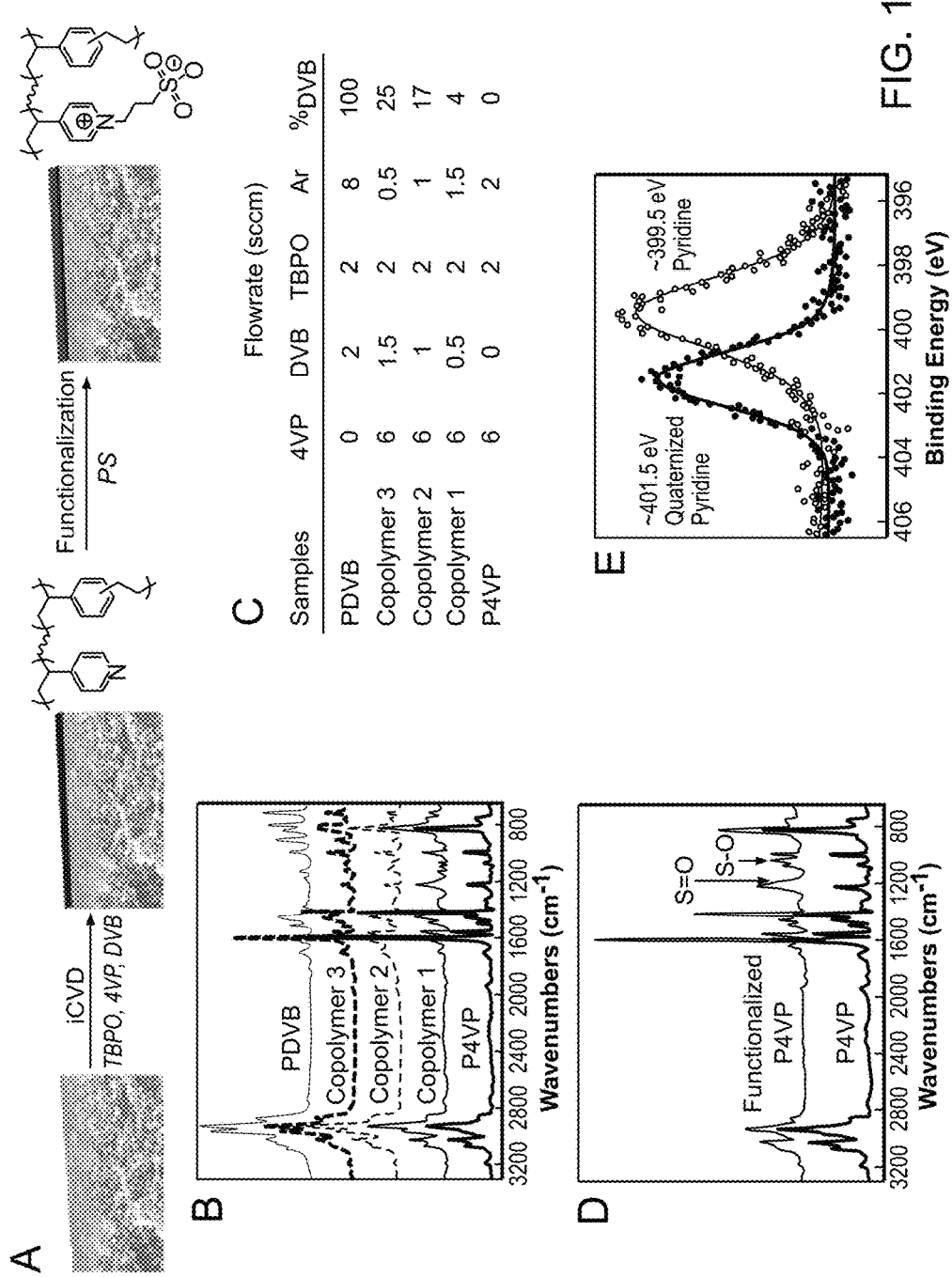
FIG. 1 depicts (a) Fabrication and application of chlorine-resistant iCVD zwitterionic coatings on a TFC RO membrane. Commercial membranes are first loaded into an iCVD chamber, and a copolymer of 4VP and DVB is deposited as a thin film on top of the polyamide semipermeable layer. The coated membranes are functionalized with PS to obtain zwitterionic moieties. (b) FTIR spectra of as-deposited copolymers and homopolymers, whose compositions are shown in (c). (d) The FTIR spectra of pre- and post-functionalized iCVD homopolymer P4VP. The functionalization is carried out with PS. Two peaks emerged after the functionalization, corresponding to the sulfonate moieties in the zwitterionic structure. (d) High resolution XPS on N(1s) before and after the functionalization. The pyridine nitrogen is seen around 399.5 eV in as-deposited iCVD P4VP; the quaternary ammonium becomes the dominant nitrogen species after the functionalization, confirming the reaction with PS.

In certain embodiments, ultrathin (30 to 300 nm) iCVD coatings were grafted and deposited directly onto commercial TFC-RO membranes (FIG. 9b), followed by the vapor phase derivatization (FIG. 1). The all-dry-processed coating conforms to the geometry of the underlying substrate (FIG. 9b,c), because surface tension and de-wetting are avoided. The root-mean-square (RMS) roughness of bare and coated RO membranes is 1.3±0.3 nm (FIG. 9c, inset) and 0.8±0.1 nm (FIG. 9c), respectively. This exceptional smoothness is important to the fouling resistance of the membrane surface, because larger surface areas and more binding sites are available for foulants to attach on a rougher surface. In addition, nano- and micro-scale roughness can entrap proteins and bacteria, respectively, and provide a "shield" to attached foulants from shear forces. The benign reaction conditions allow retention of the zwitterionic groups, as evidenced by the N(1s) high-resolution scan by X-ray photoelectron spectroscopy (XPS, FIG. 9d). The binding energy of the pyridine nitrogen species from the as-deposited iCVD layer is ~399.5 eV with a small tail around 402 eV that is attributed to the inevitable post-treatment adsorption of atmospheric $CO_2$. The binding energy of quaternized pyridine nitrogen is ~401.5 eV and the symmetric peak profile indicates complete quaternization by the PS post-treatment.

Figure 3:
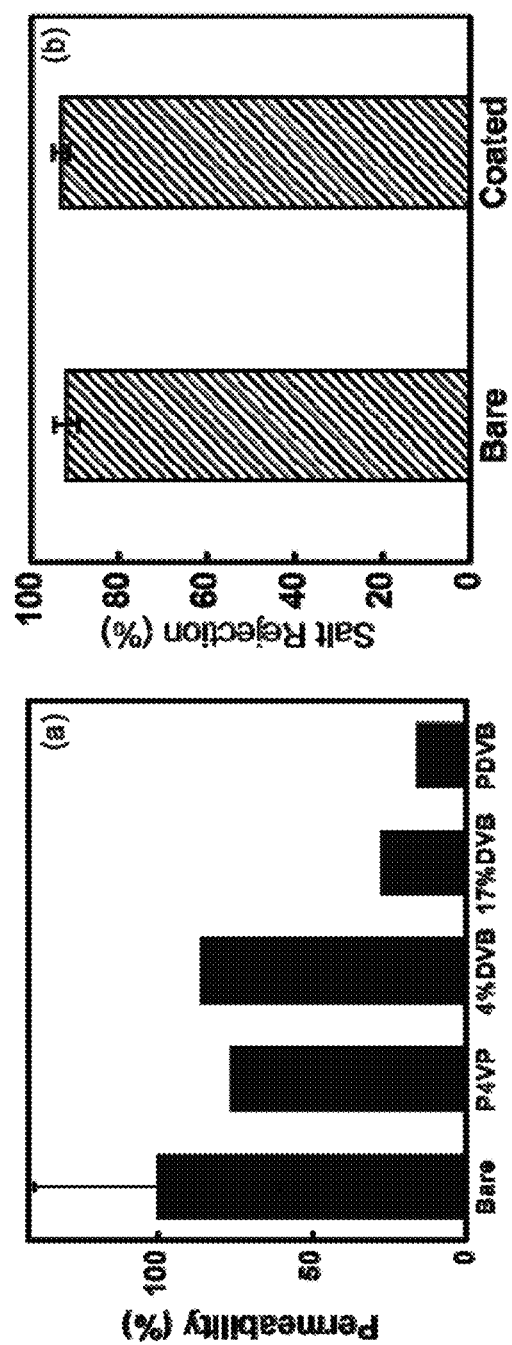
FIG. 3 depicts (a) Relative permeability of RO membranes coated with functionalized iCVD films. All the values are normalized by the permeability of bare RO. Surface modification of RO membranes with functionalized P4VP and copolymer 1 (containing 4% DVB repeat units) did not lower the permeability significantly; greater DVB incorporation (17% DVB) drastically decreases the permeability, indicating the shrink (i.e., decrease) of pore size in the iCVD films. Homopolymer of PDVB can maintain only 16% of the permeability of bare RO membranes. (b) Salt rejection of RO membranes before and after iCVD deposition and functionalization. "Coated" refers to a membrane coated with Copolymer 1 with 4% DVB repeat units and functionalized with PS. The surface modifications did not lower the salt rejection, indicating that this solventless process did not introduce defects or damage the salt-rejection layer in the membrane. Because of its room temperature and all-dry nature, the iCVD process enables this result.
Figure 9:
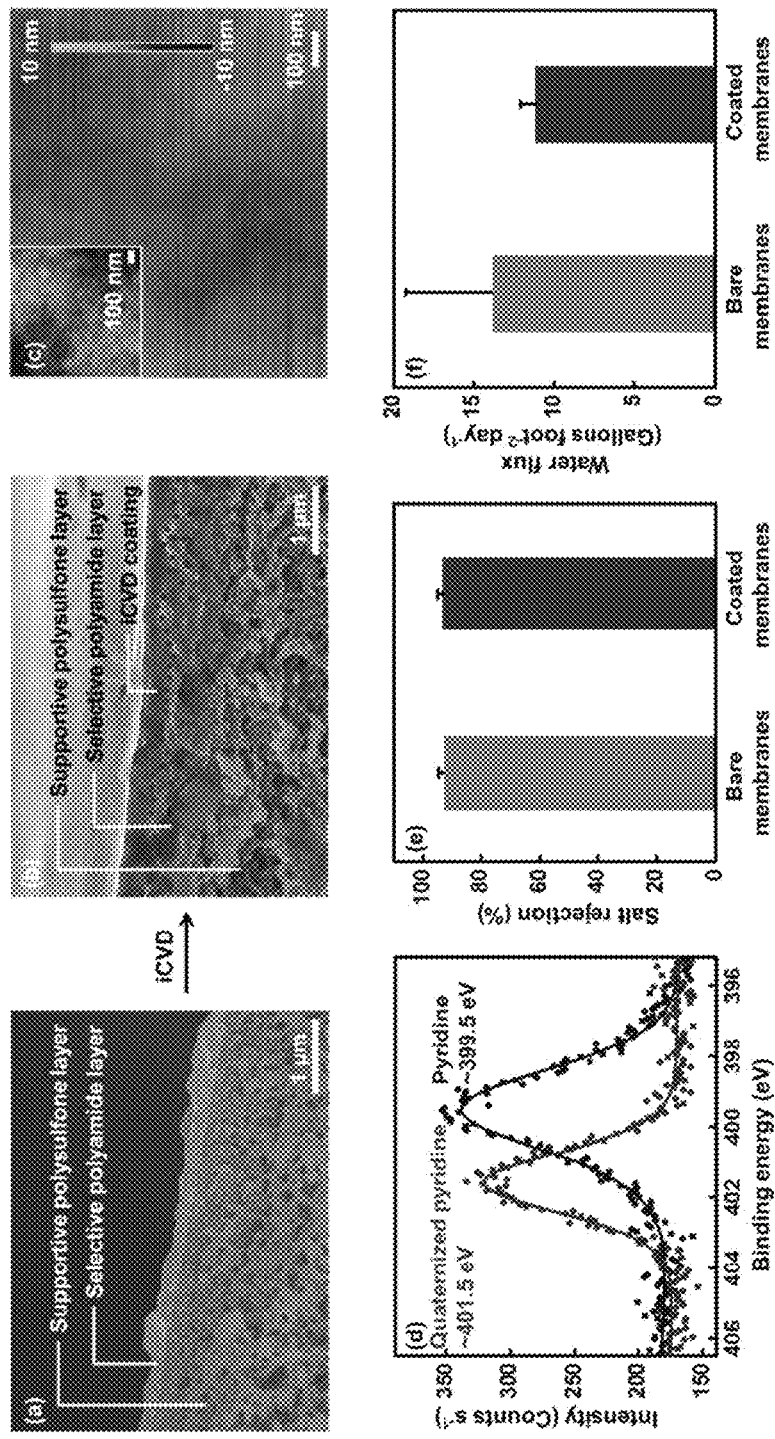
FIG. 9 depicts various properties of antifouling zwitterionic coatings applied onto commercial RO membranes via iCVD. a,b, Cross-sectional SEM image of (a) bare and (b) iCVD coated RO membrane. Panel (a) shows the porous supportive polysulfone layer beneath the nonporous, 200-nm-thick, selective polyamide layer of the RO membrane. In (b), the smooth top layer is the iCVD zwitterionic coating, which is grafted to the selective layer. c, AFM scan of coated membrane and (inset) bare membrane. Both surfaces are exceptionally smooth, with ~1 nm RMS roughness. d, N(1s) XPS high resolution scan of the iCVD P4VP as-deposited (right) and post-functionalized by PS (left), demonstrating full conversion of pyridine to zwitterion. e, Salt rejection of bare and coated membranes. The comparable values of salt rejection indicate that the coating leaves the thin selective layer of the delicate RO membranes intact. f, Water flux through bare and coated membranes. Membranes coated with 30-nm functionalized copolymer 1 maintain 86% of the original water flux. Error bars (e,f) represent the standard deviations obtained with 3 parallel tests.

The salt rejection of the surface-modified RO membranes is unaltered, confirming the benign nature of the solvent-free process (FIG. 9e). This substrate-independent method allows simultaneous deposition on multiple substrates. This feature is used to simultaneously deposit on RO membranes and on a silicon wafer in order to achieve precise control of coating thickness, which is critical because thin coatings are essential to maintaining the high water flux across RO membranes. The coating thickness on RO membranes is compared to that on a silicon wafer,[9] which is monitored via in situ interferometry. With the 30-nm coating thickness achieved with this method, the water flux is reduced only by ~14% compared to untreated RO membranes (FIG. 9f). This high water flux is achieved with an amount of the cross-linker (4%; copolymer 1; FIG. 1), divinylbenzene (DVB), sufficiently high to ensure the stability of the coating and sufficiently low to effect a minimal reduction in water flux. As expected, water flux is reduced (by 72%; FIG. 3) for higher DVB content (17%; copolymer 2) and also (by 84%) for the homopolymer PDVB, owing to its high cross-linking density. It is worth noting that copolymer 1, despite the higher cross-linking density, has similar water flux as homopolymer P4VP (FIGS. 1 and 3). This is likely a result of surface chain reorganization of copolymer 1 upon contacting water. Therefore, copolymer 1 is chosen as providing the optimal trade-off between coating stability and water flux. Taken together, these results show that the proposed approach can overcome the major challenge in the field of surface modification for desalination, by implementing antifouling chemistry without compromising water flux and salt rejection of the resulting membranes.

To reveal the chemistry of the antifouling coatings, the retention of functional groups and compositions of as-deposited and functionalized iCVD polymers were analyzed using Fourier transform infrared (FTIR). Excellent agreement was observed between the spectra of iCVD- and solution-polymerized PDVB and P4VP, indicating that the non-vinyl organic functionalities in the monomers are retained in the iCVD films. Successful polymerization of DVB is evidenced by the reduction of the 903 $cm^{-1}$ peak in the PDVB spectrum, which results from the out-of-plane $CH_2$ deformation in vinyl groups. The existence of this peak in the PDVB spectrum is due to the presence of unreacted pendant vinyl bonds. For the iCVD polymers PDVB, copolymer 2, copolymer 1, and P4VP, there is a decreasing trend in the area under the 710 $cm^{-1}$ peak, a measure of the number of m-substituted aromatic rings in the DVB repeat units. This is utilized to calculate compositions of the iCVD copolymers, which are confirmed by XPS survey scans. The composition of the copolymers can be tuned simply by varying the flow rate ratios of 4VP and DVB monomers (FIG. 1). In the spectra of P4VP and copolymers, the strong peak at 1600 $cm^{-1}$ is attributed to the C—C and C—N stretching vibrations in the pyridine ring, whose intensity increases with more P4VP repeat units (FIG. 1). FTIR spectra collected after the PS derivatization (FIG. 1) confirms the formation of the pyridine-based sulfobetaine via ring-opening of PS, as evident by the appearance of a peak at 1036 $cm^{-1}$ in the spectra of functionalized P4VP and copolymer 1. This peak is attributed to the symmetric stretching of the $SO_3^-$ group. Therefore, pyridine-based zwitterionic structures designed to resist oxidative damages are successfully synthesized using the solvent-free scheme.

Figure 4:
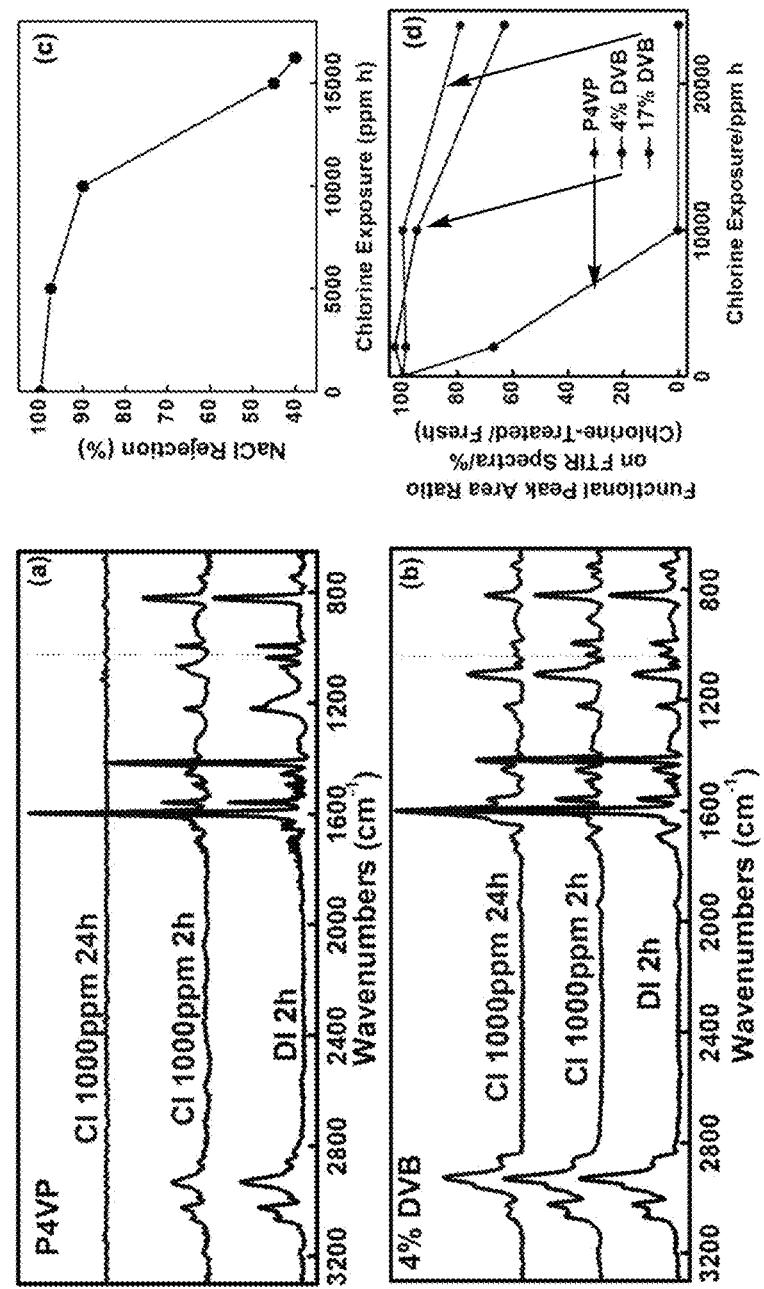
FIG. 4 depicts (a) FTIR spectra of functionalized iCVD P4VP homopolymer after various treatments with chlorine water. The coating was first soaked in DI water for 2 hours to remove any surface absorbed PS molecules and any loosely attached oligomers of 4VP. The sample was then treated with 1000 ppm chlorine for 2 hours and the S—O peak on the FTIR spectra is not visible any more, indicating the dissolution of uncrosslinked iCVD zwitterionic coating. After 24 hours in 1000 ppm Cl, the coating becomes completely soluble in water and no peaks remain in the FTIR spectrum. (b) FTIR spectra of functionalized iCVD Copolymer 1, with 4% DVB repeat units, after various treatments with chlorine water. The FTIR spectra remain the same after all treatments, indicating excellent resistance to chlorine damage. (c) Chlorine resistance of commercial RO membranes demonstrated by changes in salt rejection after chlorine exposure. After 15,000 ppm h treatment with chlorine, the salt rejection dropped to ~45%. (d) Chlorine resistance of iCVD zwitterionic coatings, which is demonstrated by measuring the peak area of pyridine ring (1600 cm$^{-1}$) on the FTIR spectra after each treatment and normalizing by the area after DI soaking. Functionalized P4VP becomes soluble after 10,000 ppm h chlorine exposure; 4% DVB renders the film significantly more resistant to chlorine. Even after 24,000 ppm h treatment over 60% of the peak area remains. 17% DVB gives even better chlorine resistance; after 24,000 ppm h chlorine exposure 80% of the peak area remains.

To evaluate the chlorine resistance of the iCVD films, the functionalized homopolymer P4VP, copolymer 1, and copolymer 2 were subjected to treatment with a 1000 ppm solution of sodium hypochlorite and FTIR spectra were acquired after different treatment durations. From the spectra, the areas under the 1600 $cm^{-1}$ peak were measured to quantify the functional retention of the zwitterionic structure; the strong peak intensity renders the quantification more accurate. The excellent chlorine resistance of copolymer 1 (4% DVB) is evident from the negligible changes in its spectrum after 2 and 24 hours of chlorine treatment (FIG. 4). In contrast, homopolymer P4VP is rendered soluble by a 10-hour exposure, as shown by the absence of functional peaks in the FTIR spectrum (FIG. 4). Importantly, the addition of 4% DVB cross-linker produces a major increase in the resistance to chlorine, whereas additions beyond 4% result in minor additional resistance (FIG. 4): after 10000 ppm h exposure to chlorine, ~94% and ~99% pyridine functionalities remain in functionalized copolymers 1 (4% DVB) and 2 (17% DVB), respectively. Functionalized copolymer 1 is thus most desirable because it resists chlorine very effectively while leaving the water flux nearly intact (FIG. 3).

Figure 5:
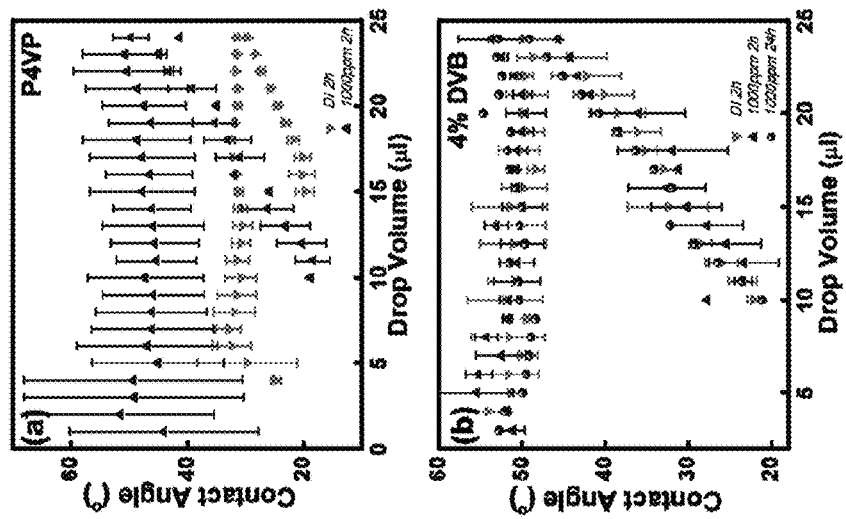
FIG. 5 depicts (a) DCA of functionalized iCVD P4VP homopolymer, before and after exposure to 2,000 ppm h chlorine. Advancing contact angles increased significantly, indicating damage to the film by chlorine. DCA of the film after 24,000 ppm h chlorine exposure is not shown here because the film is soluble. (b) DCA of functionalized iCVD copolymer with 4% DVB. DCA remain the same after 2,000 ppm h and 24,000 ppm h chlorine exposure, indicating the stability of the functionalized copolymer in chlorine solution.

These observations are corroborated by dynamic contact angle measurements on functionalized P4VP and copolymer 1 before and after chlorine treatment, which yields a comprehensive evaluation of the effects of chlorine on the coatings, because the dynamic contact angles of coated surfaces are affected by coating chemistry, surface roughness, swelling, and surface chain reorganization. For the functionalized P4VP before chlorine treatment the advancing and receding contact angles were measured (31° and 20°, respectively), whereas after 2000 ppm h chlorine exposure these values become 48° and 18°, respectively (FIG. 5(a)). These considerable changes in dynamic contact angles reflect the poor chlorine resistance of the functionalized P4VP films. In contrast, the advancing and receding contact angles of the functionalized copolymer 1 are 51° and 24°, respectively. In spite of the higher cross-linking density, copolymer 1 has similar receding contact angle as P4VP. This is a sign of surface chain reorganization and corroborates the comparable water flux obtained with functionalized P4VP and copolymer 1 films. The dynamic contact angles remain unchanged after as much as 24000 ppm h chlorine treatment (FIG. 5), confirming the excellent chlorine resistance of the functionalized copolymer 1 films: the coating chemistry, surface roughness, swelling, and surface chain reorganization all remain essentially unaltered even upon prolonged exposure to chlorine.

Figure 12:
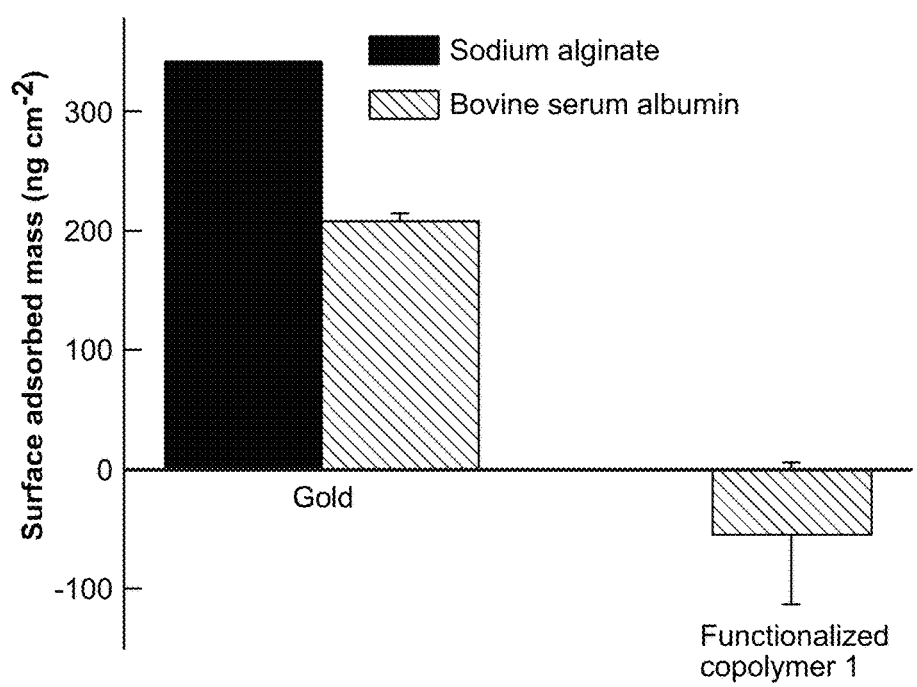
FIG. 12 depicts surface adsorption of sodium alginate (left bar) and bovine serum albumin (BSA) (right bar) on gold and functionalized copolymer 1 surfaces. One mg mL$^{-1}$ solutions were introduced into the chamber of a quartz-crystal micro-balance with dissipation monitoring (QCM-D), where the gold or coated QCM-D sensors were placed. The solutions of foulants were fed continuously for 2 h, and changes in the dissipation and frequency were recorded in situ. The dissipation changes are negligible for all cases and thus frequency changes are converted to surface adsorbed masses using the Sauerbrey equation. Gold surface adsorbs sodium alginate (blue) very strongly, and the surface mass reaches ~340 ng cm$^{-2}$ after 2 h. The adsorption of BSA (red) on gold is ~208 ng cm$^{-2}$. Functionalized copolymer 1 resists the adsorption and the surface adsorbed mass remains around 0 ng cm$^{-2}$ for both foulants, demonstrating the fouling resistance of iCVD zwitterionic coatings.
Figure 13:
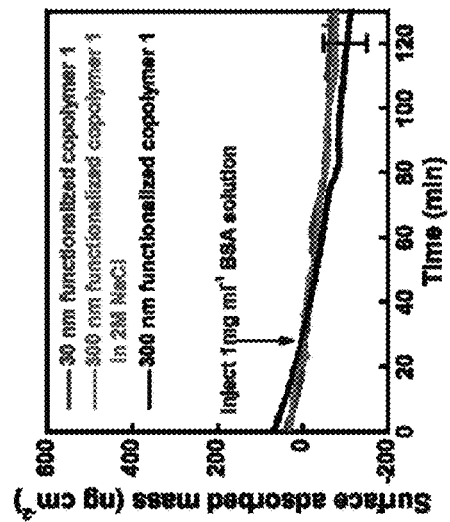
FIG. 13 depicts surface adsorption of BSA on 30-nm and 300-nm functionalized copolymer 1 surfaces under low and high salt concentrations. Phosphate-buffered saline (PBS) was used as low-salt-concentration solution; 2 M sodium chloride was added to PBS and used as high-salt-concentration solution. A 1 mg mL$^{-1}$ BSA solution, with either low or high salt concentration, was introduced into the chamber of QCM-D, where the QCM-D sensors, with either 30 nm or 300 nm functionalized copolymer 1 coating, were placed. The small difference between the surface adsorption on 30 nm and 300 nm functionalized copolymer 1 coatings is considered within experimental error, as indicated by the error bar at 120 minutes. The surface adsorbed mass was set to zero when BSA solution was injected. Therefore, the negative surface adsorbed mass is likely a result of slight loss of surface adsorbed water when the zwitterionic surface was exposed to protein solution. Coating thickness and salt concentration do not affect the antifouling property of functionalized copolymer 1 significantly, implying that the surface is charge-neutral.

In certain embodiments, the invention relates to compositions that exhibit anti-biofouling properties both with dissolved foulants and with marine bacteria. Quantification of the surface adsorption of 1 mg $mL^{-1}$ bovine serum albumin (BSA) in phosphate-buffered saline (PBS) is conducted via quartz crystal microbalance with dissipation monitoring (QCM-D). BSA is a widely used test protein for antifouling studies. Analogous tests are carried out with a representative polysaccharide, 1 mg $mL^{-1}$ sodium alginate, the major component of extracellular materials that lead to membrane biofouling. QCM-D tests reveal no adsorption of either foulant over 200 minutes on the functionalized copolymer 1 surface (FIG. 12). The thickness of the coating does not have an impact on the fouling resistance (FIG. 13), because the reaction with PS is diffusion-limited and the zwitterionic moieties are only present in the top few nanometers. The consistent fouling resistance under low (PBS buffer) and high (2 M NaCl added to PBS buffer, corresponding to ~117,000 ppm NaCl) salt concentrations implies that the functionalized copolymer 1 surface is charge-neutral (FIG. 13).

Figure 14:
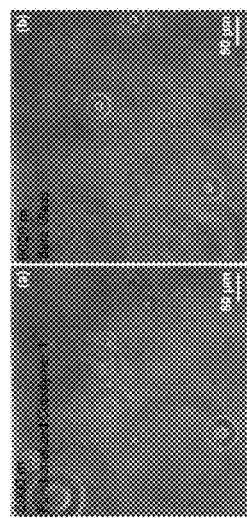
FIG. 14 depicts images of surfaces after 100 h in natural seawater. Both (a) functionalized copolymer 1 surface and (b) bare glass surface remain clean after exposure to flowing seawater for 100 h. Therefore, accelerated fouling experiments were conducted with concentrated cultures of *Vibrio cyclitrophicus*.

In certain embodiments, the surfaces were tested against fouling by marine bacteria. Both natural seawater samples and a culture of *Vibrio cyclitrophicus*, a species broadly representative of bacteria prevalent in coastal waters, from where seawater for desalination typically originates, were used. The dynamics of bacterial attachment were studied in a microfluidic flow system and imaged with an inverted microscope equipped with a CCD camera. Images were extracted from full movies and quantified by image analysis. Microchannels of 600×100 μm rectangular cross-section were fabricated out of polydimethylsiloxane (PDMS) using standard soft lithography techniques and mounted on a microscope glass slide that has been coated with a ~300-nm-thick film of functionalized copolymer 1. Fresh seawater was harvested and used on the same day as the feed solution for the microfluidic fouling tests, without any pretreatment, through continuous injection at a rate of 2 μL min$^{-1}$ (corresponding to a mean flow velocity of ~560 μm s$^{-1}$). Fabrication of multiple (2-4) microchannels on the same chip allows parallel, simultaneous experiments and thus a direct comparison of different treatments and the minimization of confounding factors. Because experiments lasting up to 100 hours reveal no discernible surface attachment (FIG. 14), irrespective of surface conditions, accelerated fouling experiments were run, using concentrated cultures of *V. cyclitrophicus* grown overnight in artificial seawater and concentrated to an optical density ($OD_{600}$=0.2; ~2×10$^8$ cells mL$^{-1}$) corresponding to early exponential phase. This bacterial concentration is ~200 times that of typical seawater.

Figure 10:
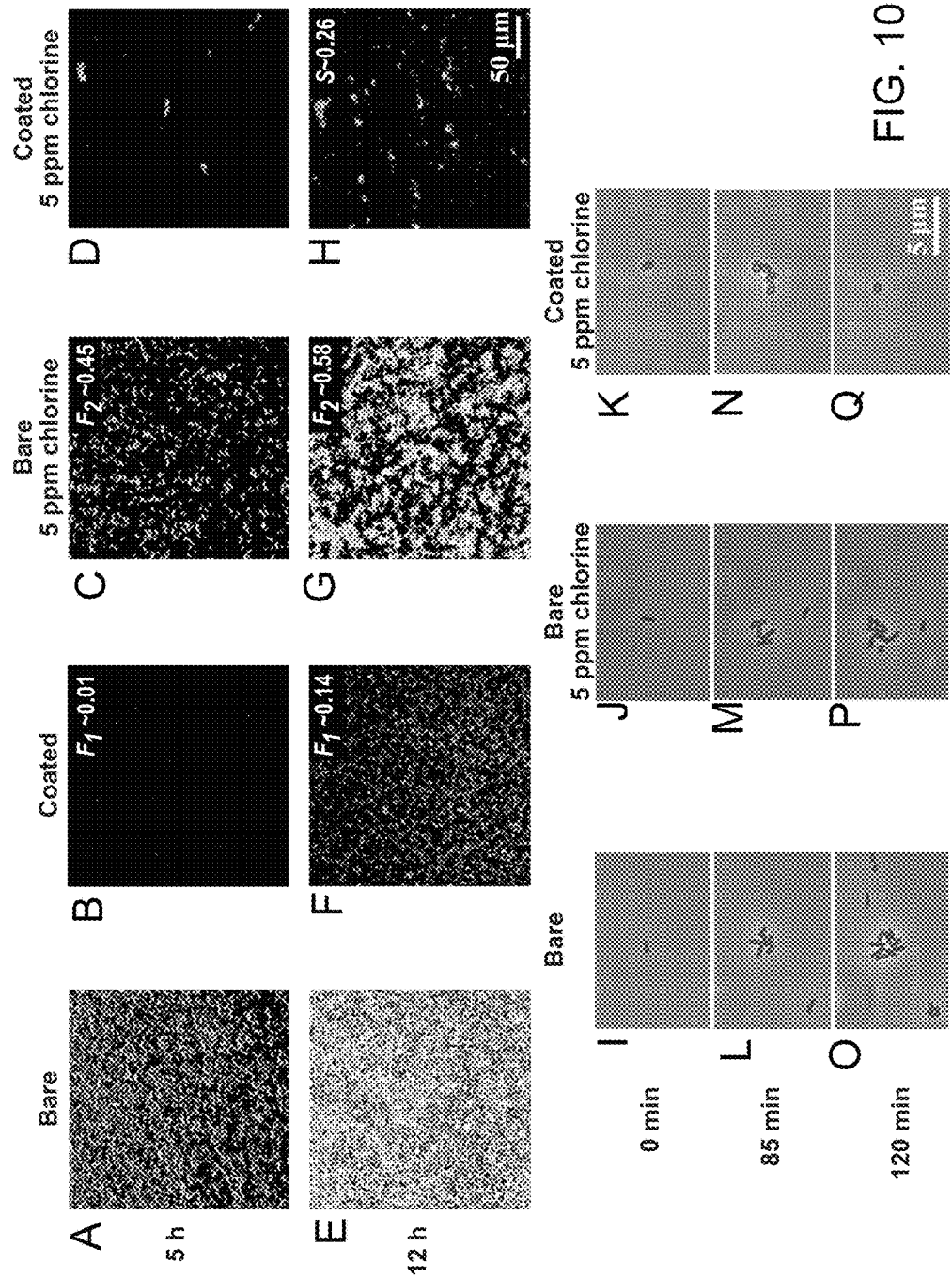
FIG. 10 depicts the enhanced fouling resistance conferred by zwitterionic surfaces and low-level chlorination. a-h, Attachment of concentrated suspensions of the marine bacteria *V. cyclitrophicus* to glass surfaces with (a,e) no treatment; (b,f) the zwitterionic coating (functionalized copolymer 1); (c,g) chlorination (5 ppm); and (d,h) the zwitterionic coating plus chlorination; results shown after 5 hours (a-d) and 12 hours (e-h). The zwitterionic coating shows no signs of fouling after 5 hours under accelerated biofouling tests conditions (b), whereas after the same amount of time the bare surface has significant surface coverage by bacteria (a). After 12 hours, neither the coating alone (f) nor chlorination alone (g) is effective at resisting biofouling, whereas the combined treatment exhibits dramatically increased fouling resistance and maintains a clean surface (h). Relative fouling indices, $F_1$ (b,f)—the fraction of surface coverage for the coated surface compared to the bare glass control—and $F_2$ (c,g)—the fraction of surface coverage in the presence of chlorination, compared to that in the absence of chlorination for a bare glass surface—are used to quantify the effects of coating and chlorination, respectively. The synergistic fouling prevention is quantified by the synergistic index, S (d,h), where S<1 indicates synergy between the coating and chlorination. Images in (a-h) are captured with the same magnification and the scale bar represents 50 μm. i-q, Comparison of the attachment and proliferation of a *V. cyclitrophicus* bacterium on (i,l,o) a bare surface, (j,m,p) a bare surface with chlorination, and (k,n,q) a coated surface with chlorination. The 5 ppm chlorine addition did not prevent bacterial proliferation on the surface (m,n,p). The zwitterionic chemistry is critical for the synergistic fouling resistance, as bacteria are readily removed from the zwitterion-coated surface by even laminar flow (Reynolds number ~0.1) (q). The scale bar represents 5 μm.
Figure 15:
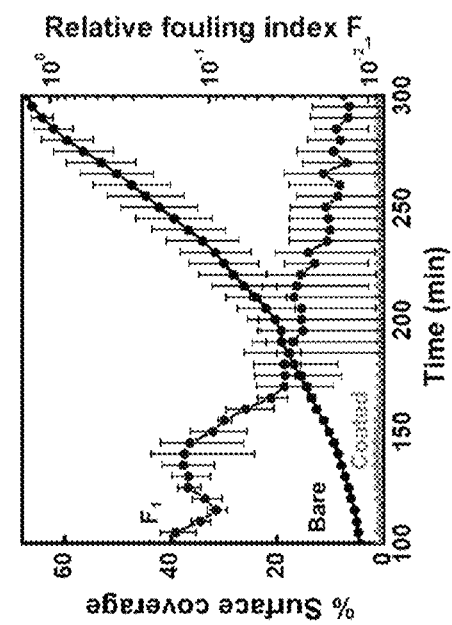
FIG. 15 depicts surface coverage by *V. cyclitrophicus* on bare glass and iCVD zwitterionic surfaces, and relative fouling index $F_1$. *V. cyclitrophicus* attaches readily on the bare glass surface (circles), for which the surface coverage reaches ~65% after 300 minutes. After the same amount of time, the functionalized copolymer 1 surface (diamonds)

In the accelerated tests, the iCVD zwitterionic coatings show much greater resistance to bacterial attachment than bare glass (FIG. 10a,b,e,f; FIG. 15). Fouling is quantified by time-lapse imaging of the surface, followed by image analysis to determine the number of attached cells and the percent surface coverage by bacteria. As the variables are time-dependent, the behavior at 5 hours and 12 hours will be discussed, but general conclusions apply also to the data at other times. Despite the intrinsic fouling resistance of glass surfaces, the number of attached cells on bare glass increases steadily over time, and exponentially after 50 minutes. After 5 hours, the cell count over a 0.16-mm$^2$ area of the bare glass surface reaches ~7500, (FIG. 10a), whereas it remains close to zero on the coated surface (FIG. 10b). Defining a relative fouling index, $F_1$, as the fraction of surface coverage for the coated surface compared to the bare glass control, it was apparent that $F_1$ decreases drastically over time for functionalized copolymer 1 and drops to ~0.01 after 5 hours (FIG. 15). This result demonstrates the exceptional fouling resistance of iCVD zwitterionic coatings, in particular in view of the fact that smooth, bare glass is already a rather good antifouling surface.

The surfaces' antifouling effects are further boosted by low-level chlorination, resulting in a new synergistic approach against fouling made possible by functionalized copolymer 1's good resistance to chlorine. Additional, accelerated microfluidic tests were run, where the suspension of *V. cyclitrophicus* is amended with 5 ppm of sodium hypochlorite (FIG. 10c,d,g,h), a concentration comparable to the residual chlorine level in the USA national drinking water standards. To quantify the effect of chlorination a second fouling index, $F_2$, computed as the fraction of surface coverage in the presence of chlorination, compared to that in the absence of chlorination, for the case of a bare glass surface, was defined. Although chlorination overall reduces surface fouling, signs of fouling on bare glass in the presence of 5 ppm chlorine emerge after 5 hours ($F_2$ ~0.45; FIG. 10c) and after 12 hours fouling is severe ($F_2$ ~0.58; FIG. 10g). Therefore, chlorination at a level of 5 ppm is less effective than the zwitterionic coating in preventing bacterial attachment. However, the synergistic effect of the zwitterionic coating and chlorination dramatically increases fouling resistance over each treatment in isolation (FIG. 10d,h). After 12-hour exposure to the *V. cyclitrophicus* suspension, the surface coverage is 35.3±1.7% on bare glass in the presence of 5 ppm chlorine ($F_2$ ~0.58), 14.1±3.4% on the coated surface without chlorine ($F_1$ ~0.14), and only 1.5±0.4% on the coated surface in the presence of 5 ppm chlorine. The percent surface coverage in the synergistic treatment is 0.02 of that of a bare glass surface without chlorine, four-fold smaller than the prediction ($F_1$×$F_2$) obtained if the effect was simply multiplicative.

An antifouling synergistic index, S (FIG. 11a, inset), was computed to quantify the synergistic effect of the two antifouling strategies. Synergistic indices have been used among others to describe the effects of multi-strategy antitumor treatments, where S<1 indicates a synergistic effect in killing tumor cells by the different strategies in the treatment. Here, S is defined as $$S = \frac{\% \text{ Surface coverage}_{combination\ treatment\ observed}}{\% Surface\ converage_{combination\ treatment\ expected}} = \frac{\% \text{ Surface converage}_{combination\ treatment\ observed}}{F_1 \times F_2 \times \% \text{ Surface converage}_{bare\ glass}} \quad (1)$$

The temporal dynamics of S (FIG. 11a, inset) reveal values of S<1 after ~400 minutes, and a subsequent steady decrease to ~0.1 after 900 minutes. No signs of saturation in the decrease are observed, demonstrating the long-term nature of the synergy. Values of S over the first 5 hours are not reported because the surface chemistry alone reduces fouling to non-detectable levels (i.e., $F_1$ ~0) during this time and thus the quantification of S is not meaningful.

In the attempt to reveal the mechanism underpinning the synergistic effect, the cell-surface interaction was investigated by observing a single bacterium for its proliferation and motility on the surface for the different treatments (FIG. 10i-q). After 85 minutes, replication had occurred under all conditions (FIG. 10l-n), at a mildly lower rate in the presence of 5 ppm chlorine (FIG. 10m,n), suggesting that the low dose of chlorine has only small effects on cell growth. This hypothesis is supported by direct viability tests (FIG. 11b), showing that the growth of V *cyclitrophicus* (measured as the optical density of cell cultures) is negligibly affected by addition of 1 ppm chlorine and exhibits a 42% reduction with 5 ppm chlorine addition. Furthermore, tracking of individual cells shows that motility is not significantly affected by 1 ppm or 5 ppm chlorination (FIG. 11c). Although growth in batch culture might differ from growth on a microchannel surface, taken together these results (FIGS. 11b and 10l-n) demonstrate that the observed antifouling and synergistic effect of chlorine are not based on killing of the bacteria. Instead, the primary difference among the three single-cell cases (FIG. 10i-q) resides in the dependence of cell removal from the surface on the surface chemistry (FIG. 10o-q): whereas bacteria remain largely attached to the bare glass surface, they are easily removed from the coated surface by ambient fluid flow, independent of the presence of chlorine. In particular, bacterial removal from the iCVD zwitterionic coating occurs readily even under the low, laminar flow conditions within the microchannel (Reynolds number ~0.1).

Initiated Chemical Vapor Deposition

Materials-processing often involves the deposition of films or layers on a surface of a substrate. One manner of effecting the deposition of such films or layers is through chemical vapor deposition (CVD). CVD involves a chemical reaction of vapor phase chemicals or reactants that contain the constituents to be deposited on the substrate. Reactant gases are introduced into a reaction chamber or reactor, and are decomposed and reacted at a heated surface to form the desired film or layer.

One method of CVD is initiated CVD (iCVD). In an iCVD process, thin filament wires are heated, thus supplying the energy to fragment a thermally-labile initiator, thereby forming a radical at moderate temperatures. The use of an initiator not only allows the chemistry to be controlled, but also accelerates film growth and provides control of molecular weight and rate. The energy input is low due to the low filament temperatures, but high growth rates may be achieved. The process progresses independent from the shape or composition of the substrate, is easily scalable, and easily integrated with other processes.

In certain embodiments, iCVD takes place in a reactor. In certain embodiments, a variety of monomer species may be polymerized and deposited by iCVD; these monomer species are well-known in the art. In certain embodiments, the surface to be coated is placed on a stage in the reactor and gaseous precursor molecules are fed into the reactor; the stage may be the bottom of the reactor and not a separate entity. In certain embodiments, a variety of carrier gases are useful in iCVD; these carrier gases are well-known in the art.

In certain embodiments, the iCVD reactor has automated electronics to control reactor pressure and to control reactant flow rates. In certain embodiments, any unreacted vapors may be exhausted from the system.

In certain embodiments, the iCVD coating process can take place at a range of pressures from atmospheric pressure to low vacuum. In certain embodiments, the pressure is less than about 50 torr. In certain embodiments, the pressure is less than about 40 torr. In certain embodiments, the pressure is less than about 30 torr. In certain embodiments, the pressure is less than about 20 torr. In certain embodiments, the pressure is less than about 10 torr. In certain embodiments, the pressure is less than about 5 torr. In certain embodiments, the pressure is less than about 1 torr. In certain embodiments, the pressure is less than about 0.7 torr. In certain embodiments, the pressure is less than about 0.4 torr. In certain embodiments, the pressure is about 50 torr. In certain embodiments, the pressure is about 40 torr. In certain embodiments, the pressure is about 30 torr. In certain embodiments, the pressure is about 20 torr. In certain embodiments, the pressure is about 10 torr. In certain embodiments, the pressure is about 5 torr. In certain embodiments, the pressure is about 1 torr. In certain embodiments, the pressure is about 0.7 torr. In certain embodiments, the pressure is about 0.4 torr. In certain embodiments, the pressure is about 0.2 torr. In certain embodiments, the pressure is about 0.1 torr. In certain embodiments the pressure is about 1 torr; about 0.9 torr; about 0.8 torr; about 0.7 torr; about 0.6 torr; about 0.5 torr; about 0.4 torr; about 0.3 torr; about 0.2 torr; or about 0.1 torr. In certain embodiments, the pressure is greater than about 1 mtorr.

In certain embodiments, the flow rate of the monomer can be adjusted in the iCVD method. In certain embodiments, the monomer flow rate is about 100 sccm (standard cubic centimeters per minute). In certain embodiments, the monomer flow rate is about 90 sccm. In certain embodiments, the monomer flow rate is about 80 sccm. In certain embodiments the monomer flow rate is about 70 sccm. In certain embodiments, the monomer flow rate is about 60 sccm. In certain embodiments, the monomer flow rate is about 50 sccm. In certain embodiments, the monomer flow rate is about 40 sccm. In certain embodiments, the monomer flow rate is about 30 sccm. In certain embodiments, the monomer flow rate is about 20 sccm. In certain embodiments, the monomer flow rate is less than about 100 sccm. In certain embodiments, the monomer flow rate is less than about 90 sccm. In certain embodiments, the monomer flow rate is less than about 80 sccm. In certain embodiments, the monomer flow rate is less than about 70 sccm. In certain embodiments, the monomer flow rate is less than about 60 sccm. In certain embodiments, the monomer flow rate is less than about 50 sccm. In certain embodiments, the monomer flow rate is less than about 40 sccm. In certain embodiments, the monomer flow rate is less than about 30 sccm. In certain embodiments, the monomer flow rate is less than about 20 sccm. In certain embodiments, the monomer flow rate is about 15 sccm. In certain embodiments, the flow rate is less than about 15 sccm. In certain embodiments, the monomer flow rate is about 14 sccm. In certain embodiments, the flow rate is less than about 14 sccm. In certain embodiments, the monomer flow rate is about 13 sccm. In certain embodiments, the flow rate is less than about 13 sccm. In certain embodiments, the monomer flow rate is about 12 sccm. In certain embodiments, the flow rate is less than about 12 sccm. In certain embodiments, the monomer flow rate is about 11 sccm. In certain embodiments, the flow rate is less than about 11 sccm. In certain embodiments, the monomer flow rate is about 10 sccm. In certain embodiments, the flow rate is less than about 10 sccm. In certain embodiments, the monomer flow rate is about 9 sccm. In certain embodiments, the flow rate is less than about 9 sccm. In certain embodiments, the monomer flow rate is about 8 sccm. In certain embodiments, the flow rate is less than about 8 sccm. In certain embodiments, the monomer flow rate is about 7 sccm. In certain embodiments, the flow rate is less than about 7 sccm. In certain embodiments, the monomer flow rate is about 6 sccm. In certain embodiments, the flow rate is less than about 6 sccm. In certain embodiments, the monomer flow rate is about 5 sccm. In certain embodiments, the flow rate is less than about 5 sccm. In certain embodiments, the monomer flow rate is about 3 sccm. In certain embodiments, the flow rate is less than about 3 sccm. In certain embodiments, the monomer flow rate is about 1.5 sccm. In certain embodiments, the flow rate is less than about 1.5 sccm. In certain embodiments, the monomer flow rate is about 0.75 sccm. In certain embodiments, the flow rate is less than about 0.75 sccm. In certain embodiments, the monomer flow rate is about 0.6 sccm. In certain embodiments, the flow rate is less than about 0.6 sccm. In certain embodiments, the monomer flow rate is about 0.5 sccm. In certain embodiments, the flow rate is less than about 0.5 sccm. When more than one monomer is used (i.e., to deposit co-polymers), the flow rate of the additional monomers, in certain embodiments, may be the same as those presented above.

In certain embodiments, the temperature of the monomer can be adjusted in the iCVD method. In certain embodiments, the monomer can be heated and delivered to the chamber by a heated mass flow controller. In certain embodiments, the monomer can be heated and delivered to the chamber by a needle valve. In certain embodiments, the monomer is heated at about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In certain embodiments, the flow rate of the initiator can be adjusted in the iCVD method. In certain embodiments the initiator flow rate is about 100 sccm. In certain embodiments, the initiator flow rate is about 90 sccm. In certain embodiments, the initiator flow rate is about 80 sccm. In certain embodiments, the initiator flow rate is about 70 sccm. In certain embodiments, the initiator flow rate is about 60 sccm. In certain embodiments, the initiator flow rate is about 50 sccm. In certain embodiments, the initiator flow rate is about 40 sccm. In certain embodiments, the initiator flow rate is about 30 sccm. In certain embodiments, the initiator flow rate is about 20 sccm. In certain embodiments, the initiator flow rate is less than about 100 sccm. In certain embodiments, the initiator flow rate is less than about 90 sccm. In certain embodiments, the initiator flow rate is less than about 80 sccm. In certain embodiments, the initiator flow rate is less than about 70 sccm. In certain embodiments, the initiator flow rate is less than about 60 sccm. In certain embodiments, the initiator flow rate is less than about 50 sccm. In certain embodiments, the initiator flow rate is less than about 40 sccm. In certain embodiments, the initiator flow rate is less than about 30 sccm. In certain embodiments, the initiator flow rate is less than about 20 sccm. In certain embodiments, the initiator flow rate is about 10 sccm. In certain embodiments, the flow rate is less than about 10 sccm. In certain embodiments, the initiator flow rate is about 5 sccm. In certain embodiments, the flow rate is less than about 5 sccm. In certain embodiments, the initiator flow rate is about 3 sccm. In certain embodiments, the flow rate is less than about 3 sccm. In certain embodiments, the initiator flow rate is about 1.5 sccm. In certain embodiments, the flow rate is less than about 1.5 sccm. In certain embodiments, the initiator flow rate is about 0.75 sccm. In certain embodiments, the flow rate is less than about 0.75 sccm. In certain embodiments, the initiator flow rate is about 0.5 sccm. In certain embodiments, the flow rate is less than about 0.5 sccm. In certain embodiments, the initiator flow rate is about 0.4 sccm. In certain embodiments, the flow rate is less than about 0.4 sccm. In certain embodiments, the initiator flow rate is about 0.3 sccm. In certain embodiments, the flow rate is less than about 0.3 sccm. In certain embodiments, the initiator flow rate is about 0.2 sccm. In certain embodiments, the flow rate is less than about 0.2 sccm. In certain embodiments, the initiator flow rate is about 0.1 sccm. In certain embodiments, the flow rate is less than about 0.1 sccm. In certain embodiments, a variety of initiators are useful in iCVD; these initiators are well-known in the art.

In certain embodiments, the carrier gas is an inert gas. In certain embodiments, the carrier gas is nitrogen or argon.

In certain embodiments, the flow rate of the carrier gas can be adjusted in the iCVD method. In certain embodiments, the carrier gas flow rate is about 1000 sccm. In certain embodiments, the carrier gas flow rate is about 900 sccm. In certain embodiments, the carrier gas flow rate is about 800 sccm. In certain embodiments, the carrier gas flow rate is about 700 sccm. In certain embodiments, the carrier gas flow rate is about 600 sccm. In certain embodiments, the carrier gas flow rate is about 500 sccm. In certain embodiments, the carrier gas flow rate is about 400 sccm. In certain embodiments, the carrier gas flow rate is about 300 sccm. In certain embodiments, the carrier gas flow rate is about 200 sccm. In certain embodiments, the carrier gas flow rate is about 100 sccm. In certain embodiments, the carrier gas flow rate is about 90 sccm. In certain embodiments, the carrier gas flow rate is about 80 sccm. In certain embodiments, the carrier gas flow rate is about 70 sccm. In certain embodiments, the carrier gas flow rate is about 60 sccm. In certain embodiments, the carrier gas flow rate is about 50 sccm. In certain embodiments, the carrier gas flow rate is about 40 sccm. In certain embodiments, the carrier gas flow rate is about 30 sccm. In certain embodiments, the carrier gas flow rate is about 20 sccm. In certain embodiments, the carrier gas flow rate is less than about 1000 sccm. In certain embodiments, the carrier gas flow rate is less than about 900 sccm. In certain embodiments, the carrier gas flow rate is less than about 800 sccm. In certain embodiments, the carrier gas flow rate is less than about 700 sccm. In certain embodiments, the carrier gas flow rate is less than about 600 sccm. In certain embodiments, the carrier gas flow rate is less than about 500 sccm. In certain embodiments, the carrier gas flow rate is less than about 400 sccm. In certain embodiments, the carrier gas flow rate is less than about 300 sccm. In certain embodiments, the carrier gas flow rate is less than about 200 sccm. In certain embodiments, the carrier gas flow rate is less than about 100 sccm. In certain embodiments, the carrier gas flow rate is less than about 90 sccm. In certain embodiments, the carrier gas flow rate is less than about 80 sccm. In certain embodiments, the carrier gas flow rate is less than about 70 sccm. In certain embodiments, the carrier gas flow rate is less than about 60 sccm. In certain embodiments the carrier gas flow rate is less than about 50 sccm. In certain, embodiments the carrier gas flow rate is less than about 40 sccm. In certain embodiments, the carrier gas flow rate is less than about 30 sccm. In certain embodiments, the carrier gas flow rate is less than about 20 sccm. In certain embodiments, the carrier gas flow rate is about 10 sccm. In certain embodiments, the flow rate is less than about 10 sccm. In certain embodiments, the carrier gas flow rate is about 5 sccm. In certain embodiments, the flow rate is less than about 5 sccm. In certain embodiments, the flow rate is greater than about 4 sccm.

In certain embodiments, the temperature of the filament can be adjusted in the iCVD method. In certain embodiments the temperature of the filament is about 350° C. In certain embodiments the temperature of the filament is about 300° C. In certain embodiments the temperature of the filament is about 250° C. In certain embodiments the temperature of the filament is about 245° C. In certain embodiments the temperature of the filament is about 235° C. In certain embodiments the temperature of the filament is about 225° C. In certain embodiments the temperature of the filament is about 200° C. In certain embodiments the temperature of the filament is about 150° C. In certain embodiments the temperature of the filament is about 100° C.

In certain embodiments, the filament is from about 0.1 cm to about 20 cm from the substrate stage. In certain embodiments, the filament is about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 3.0 cm, about 3.5 cm, about 4.0 cm, about 4.5 cm, about 5.0 cm, about 5.5 cm, about 6.0 cm, about 6.5 cm, about 7.0 cm, about 7.5 cm, about 8.0 cm, about 8.5 cm, about 9.0 cm, about 9.5 cm, about 10 cm, about 11 cm, about 12 cm, about 13 cm, about 14 cm, about 15 cm, about 16 cm, about 17 cm, about 18 cm, about 19 cm, or about 20 cm from the substrate stage. In certain embodiments, the filament is about 1.4 cm from the substrate stage.

In certain embodiments, the filament is oriented in any orientation with respect to the substrate stage or the chamber. In certain embodiments, the filament is oriented above the substrate stage, below the substrate stage, or beside the substrate stage.

In certain embodiments, the iCVD coating process can take place at a range of temperatures of the substrate stage. In certain embodiments, the temperature of the substrate stage is ambient temperature. In certain embodiments, the temperature of the substrate stage is about 25° C.; in yet other embodiments the temperature of the substrate stage is between about 25° C. and about 100° C., or between about 0° C. and about 25° C. In certain embodiments said temperature of the substrate stage is controlled by water.

In certain embodiments, the rate of polymer deposition is about 1 micron/minute. In certain embodiments, the rate of polymer deposition is between about 1 micron/minute and about 50 nm/minute. In certain embodiments, the rate of polymer deposition is between about 10 micron/minute and about 50 nm/minute. In certain embodiments, the rate of polymer deposition is between about 100 micron/minute and about 50 nm/minute. In certain embodiments, the rate of polymer deposition is between about 1 nm/minute and about 50 nm/minute. In certain embodiments, the rate of polymer deposition is between about 10 nm/minute and about 50 nm/minute. In certain embodiments, the rate of polymer deposition is between about 10 nm/minute and about 25 nm/minute.

Polymers of the Invention

In certain embodiments, the invention relates to a polymer, wherein the polymer comprises a first repeat unit and a second repeat unit;

the first repeat unit is

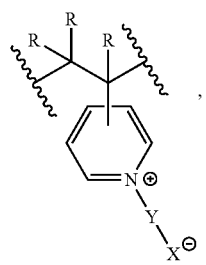, wherein, independently for each occurrence,

R is H, alkyl, halo, hydroxy, amino, nitro, or cyano;

Y is a linker that does not comprise an amide bond, an ester bond, or an ether bond; and $X^\ominus$ is $-SO_3^\ominus$, $-HPO_3^\ominus$, or $-CO_2^\ominus$;

the second repeat unit is

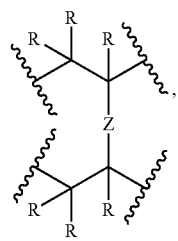, wherein, independently for each occurrence,

R is H, alkyl, halo, hydroxy, amino, nitro, or cyano; and

Z is a linker that does not comprise an amide bond, an ester bond, or an ether bond.

In certain embodiments, the invention relates to any one of the aforementioned polymers, wherein the polymer comprises the second repeat unit in an amount of about 1-99 mol %, 5-95 mol %, 5-90 mol %, 10-85 mol %, 10-80 mol %, 15-75 mol %, 15-70 mol %, 20-65 mol %, 20-60 mol %, 25-55 mol %, 25-50 mol %, 30-45 mol %, 30-40 mol %, 85-95 mol %, 75-85 mol %, 65-75 mol %, 55-65 mol %, 45-55 mol %, 35-45 mol %, 25-35 mol %, 15-25 mol %, or 5-10 mol %.

In certain embodiments, the invention relates to any one of the aforementioned polymers, wherein the polymer comprises the second repeat unit in an amount of about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, or about 30 mol %.

In certain embodiments, the invention relates to any one of the aforementioned polymers, wherein the first repeat unit is

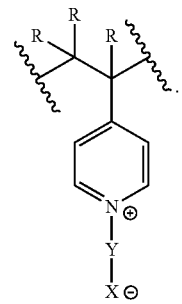

In certain embodiments, the invention relates to any one of the aforementioned polymers, wherein R is H or alkyl. In certain embodiments, the invention relates to any one of the aforementioned polymers, wherein R is H.

In certain embodiments, the invention relates to any one of the aforementioned polymers, wherein Y is alkylene. In certain embodiments, the invention relates to any one of the aforementioned polymers, wherein Y is propylene. In certain embodiments, the invention relates to any one of the aforementioned polymers, wherein Y is 1,3-propylene.

In certain embodiments, the invention relates to any one of the aforementioned polymers, wherein X is $-SO_3^\ominus$.

In certain embodiments, the invention relates to any one of the aforementioned polymers, wherein Z is arylene or alkylene. In certain embodiments, the invention relates to any one of the aforementioned polymers, wherein Z is phenylene. In certain embodiments, the invention relates to any one of the aforementioned polymers, wherein Z is 1,4-phenylene.

In certain embodiments, the invention relates to any one of the aforementioned polymers, wherein the polymer consists essentially of a plurality of first repeat units and a plurality of second repeat units.

Compositions of the Invention

In certain embodiments, the invention relates to a composition, wherein the composition comprises a substrate and a coating material, wherein the coating material comprises any one of the aforementioned polymers.

In certain embodiments, the invention relates to any one of the aforementioned compositions, wherein coating material consists essentially of any one of the aforementioned polymers.

In certain embodiments, the invention relates to any one of the aforementioned compositions, wherein the thickness of the coating material is from about 10 nm to about 1500 nm. In certain embodiments, the invention relates to any one of the aforementioned compositions, wherein the thickness of the coating material is about 10 nm, about 20 nm, about 30 nm, about 40 nm, about 50 nm, about 60 nm, about 70 nm, about 80 nm, about 90 nm, about 100 nm, about 125 nm, about 150 nm, about 175 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 675 nm, about 700 nm, about 725 nm, about 750 nm, about 775 nm, about 800 nm, about, 825 nm, about 850 nm, about 875 nm, about 900 nm, about 1000 nm, about 1100 nm, about 1200 nm, about 1300 nm, about 1400 nm, or about 1500 nm.

In certain embodiments, the invention relates to any one of the aforementioned compositions, wherein the substrate is homogeneous.

In certain embodiments, the invention relates to any one of the aforementioned compositions, wherein the substrate is heterogeneous.

In certain embodiments, the invention relates to any one of the aforementioned compositions, wherein the substrate is planar or non-planar.

In certain embodiments, the invention relates to any one of the aforementioned compositions, wherein the substrate is porous.

In certain embodiments, the invention relates to any one of the aforementioned compositions, wherein the substrate comprises a polysulfone, a polyimide, or a polyamide.

In certain embodiments, the invention relates to any one of the aforementioned compositions, wherein the surface of the substrate is concave or convex.

In certain embodiments, the invention relates to any one of the aforementioned compositions, wherein the substrate is a membrane.

In certain embodiments, the invention relates to any one of the aforementioned compositions, wherein the substrate is an RO membrane.

In certain embodiments, the invention relates to any one of the aforementioned compositions, wherein the substrate is a medical device.

In certain embodiments, the invention relates to any one of the aforementioned compositions, wherein the substrate is a surface of a hull of a ship, wherein said surface is exposed to water.

In certain embodiments, the invention relates to any one of the aforementioned compositions, wherein the substrate is a surface of an object exposed to water, wherein said surface is exposed to said water.

In certain embodiments, the invention relates to any one of the aforementioned compositions, wherein the substrate is a surface in a hospital operating theater.

In certain embodiments, the invention relates to any one of the aforementioned compositions, wherein the substrate is a surface of a floor in a hospital.

In certain embodiments, the invention relates to any one of the aforementioned compositions, wherein the substrate is a surface of a laboratory bench.

In certain embodiments, the invention relates to any one of the aforementioned compositions, wherein the substrate is a wooden surface.

In certain embodiments, the invention relates to any one of the aforementioned compositions, wherein the substrate is a surface of a food processing device.

In certain embodiments, the invention relates to any one of the aforementioned compositions, wherein the substrate is a surface on which food is prepared.

In certain embodiments, the invention relates to any one of the aforementioned compositions, wherein the substrate is a porcelain surface.

In certain embodiments, the invention relates to any one of the aforementioned compositions, wherein the substrate is a plastic surface.

In certain embodiments, the invention relates to any one of the aforementioned compositions, wherein the permeability of the composition is about 50%, about 55%, about 60%, about 65%, about 70%, about 75%, about 80%, about 85%, about 90%, about 95%, or about 99% of the permeability of the substrate alone, without the coating material, under identical conditions.

In certain embodiments, the invention relates to any one of the aforementioned compositions, wherein the composition rejects about 70%, about 75%, about 80%, about 85%, about 90%, about 95%, or about 99% of the salt in a feed solution as compared to the substrate alone, without the coating material, under identical conditions. In certain embodiments, the invention relates to any one of the aforementioned compositions, wherein the feed solution comprises salt up to about 1000 ppm, about 1500 ppm, about 2000 ppm, about 2500 ppm, about 3000 ppm, 4000 ppm, 5000 ppm, 6000 ppm, 7000 ppm, 8000 ppm, 9000 ppm, about 10,000 ppm, about 15,000 ppm, about 20,000 ppm, about 25,000 ppm, about 30,000 ppm, or about 35,000 ppm. In certain embodiments, the invention relates to any one of the aforementioned compositions, wherein the salt in the feed solution is sodium chloride.

In certain embodiments, the invention relates to any one of the aforementioned compositions, wherein the permeability of the composition is not substantially changed after contact with about 2000 ppm h chlorine, about 2500 ppm h chlorine, about 3000 ppm h chlorine, about 3500 ppm h chlorine, about 4000 ppm h chlorine, about 4500 ppm h chlorine, about 5000 ppm h chlorine, about 5500 ppm h chlorine, about 6000 ppm h chlorine, about 6500 ppm h chlorine, about 7000 ppm h chlorine, about 7500 ppm h chlorine, about 8000 ppm h chlorine, about 8500 ppm h chlorine, about 9000 ppm h chlorine, about 9500 ppm h chlorine, about 10000 ppm h chlorine, about 10500 ppm h chlorine, about 11000 ppm h chlorine, about 11500 ppm h chlorine, about 12000 ppm h chlorine, about 12500 ppm h chlorine, about 13000 ppm h chlorine, about 13500 ppm h chlorine, about 14000 ppm h chlorine, about 14500 ppm h chlorine, or about 15000 ppm h chlorine.

In certain embodiments, the invention relates to any one of the aforementioned compositions, wherein the salt rejection ability of the composition is not substantially changed after contact with about 2000 ppm h chlorine, about 2500 ppm h chlorine, about 3000 ppm h chlorine, about 3500 ppm h chlorine, about 4000 ppm h chlorine, about 4500 ppm h chlorine, about 5000 ppm h chlorine, about 5500 ppm h chlorine, about 6000 ppm h chlorine, about 6500 ppm h chlorine, about 7000 ppm h chlorine, about 7500 ppm h chlorine, about 8000 ppm h chlorine, about 8500 ppm h chlorine, about 9000 ppm h chlorine, about 9500 ppm h chlorine, about 10000 ppm h chlorine, about 10500 ppm h chlorine, about 11000 ppm h chlorine, about 11500 ppm h chlorine, about 12000 ppm h chlorine, about 12500 ppm h chlorine, about 13000 ppm h chlorine, about 13500 ppm h chlorine, about 14000 ppm h chlorine, about 14500 ppm h chlorine, or about 15000 ppm h chlorine.

In certain embodiments, the invention relates to any one of the aforementioned compositions, wherein the dynamic contact angle of the composition is not substantially changed after contact with about 1000 ppm h chlorine, about 1500 ppm h chlorine, about 2000 ppm h chlorine, about 2500 ppm h chlorine, about 3000 ppm h chlorine, about 3500 ppm h chlorine, about 4000 ppm h chlorine, about 4500 ppm h chlorine, about 5000 ppm h chlorine, about 5500 ppm h chlorine, about 6000 ppm h chlorine, about 6500 ppm h chlorine, about 7000 ppm h chlorine, about 7500 ppm h chlorine, about 8000 ppm h chlorine, about 8500 ppm h chlorine, about 9000 ppm h chlorine, about 9500 ppm h chlorine, about 10000 ppm h chlorine, about 10500 ppm h chlorine, about 11000 ppm h chlorine, about 11500 ppm h chlorine, about 12000 ppm h chlorine, about 12500 ppm h chlorine, about 13000 ppm h chlorine, about 13500 ppm h chlorine, about 14000 ppm h chlorine, about 14500 ppm h chlorine, about 15000 ppm h chlorine, about 16000 ppm h chlorine, about 17000 ppm h chlorine, about 18000 ppm h chlorine, about 19000 ppm h chlorine, about 20000 ppm h chlorine, about 21000 ppm h chlorine, about 22000 ppm h chlorine, about 23000 ppm h chlorine, about 24000 ppm h chlorine, about 25000 ppm h chlorine, about 26000 ppm h chlorine, about 27000 ppm h chlorine, about 28000 ppm h chlorine, about 29000 ppm h chlorine, about 30000 ppm h chlorine, about 31000 ppm h chlorine, about 32000 ppm h chlorine, about 33000 ppm h chlorine, about 34000 ppm h chlorine, about 35000 ppm h chlorine, or about 36000 ppm h chlorine.

In certain embodiments, the invention relates to any one of the aforementioned compositions, wherein the coating material is not substantially soluble in ethanol.

In certain embodiments, the invention relates to any one of the aforementioned compositions, wherein, after contact with about 1000 ppm h chlorine, about 1500 ppm h chlorine, about 2000 ppm h chlorine, about 2500 ppm h chlorine, about 3000 ppm h chlorine, about 3500 ppm h chlorine, about 4000 ppm h chlorine, about 4500 ppm h chlorine, about 5000 ppm h chlorine, about 5500 ppm h chlorine, about 6000 ppm h chlorine, about 6500 ppm h chlorine, about 7000 ppm h chlorine, about 7500 ppm h chlorine, about 8000 ppm h chlorine, about 8500 ppm h chlorine, about 9000 ppm h chlorine, about 9500 ppm h chlorine, about 10000 ppm h chlorine, about 10500 ppm h chlorine, about 11000 ppm h chlorine, about 11500 ppm h chlorine, about 12000 ppm h chlorine, about 12500 ppm h chlorine, about 13000 ppm h chlorine, about 13500 ppm h chlorine, about 14000 ppm h chlorine, about 14500 ppm h chlorine, about 15000 ppm h chlorine, about 16000 ppm h chlorine, about 17000 ppm h chlorine, about 18000 ppm h chlorine, about 19000 ppm h chlorine, about 20000 ppm h chlorine, about 21000 ppm h chlorine, about 22000 ppm h chlorine, about 23000 ppm h chlorine, about 24000 ppm h chlorine, about 25000 ppm h chlorine, about 26000 ppm h chlorine, about 27000 ppm h chlorine, about 28000 ppm h chlorine, about 29000 ppm h chlorine, about 30000 ppm h chlorine, about 31000 ppm h chlorine, about 32000 ppm h chlorine, about 33000 ppm h chlorine, about 34000 ppm h chlorine, about 35000 ppm h chlorine, or about 36000 ppm h chlorine, about 50%, about 55%, about 60%, about 65%, about 70%, about 75%, about 80%, about 85%, about 90%, about 95%, or about 99% of the coating material remains in the composition, as compared to the original amount of coating material.

In certain embodiments, the invention relates to any one of the aforementioned compositions, wherein the composition displays antifouling properties.

In certain embodiments, the invention relates to any one of the aforementioned compositions, wherein the composition is chlorine-resistant.

In certain embodiments, the invention relates to any one of the aforementioned compositions, wherein the composition maintains high flux after the coating process.

In certain embodiments, the invention relates to any one of the aforementioned compositions, wherein the composition maintains high salt rejection after the coating process.

In certain embodiments, the invention relates to any one of the aforementioned compositions, wherein the composition displays good coating stability in long-term use.

Another aspect of the invention relates to the composition obtained by the process of any one of methods discussed below.

Methods of the Invention

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with any one of the aforementioned polymers.

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with a polymer comprising a second repeat unit and a third repeat unit, wherein the second repeat unit is

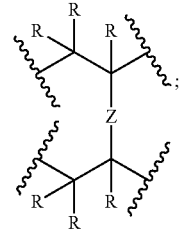

the third repeat unit is

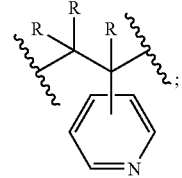

R is H, alkyl, halo, hydroxy, amino, nitro, or cyano; and Z is a linker that does not comprise an amide bond, an ester bond, or an ether bond, thereby producing a pyridine-coated substrate.

In certain embodiments, the invention relates to any one of the aforementioned methods, further comprising the step of: contacting the pyridine-coated substrate with a zwitterionic precursor. The zwitterionic precursor may be any compound with a molecular weight less than 500 amu which comprises an electrophilic functional group that can react with a nucleophilic pyridine nitrogen atom, wherein upon reaction with the pyridine nitrogen atom a covalent bond is formed and a tethered anionic functional group (e.g., a carboxylate, sulfonate, or phosphonate) is produced. In certain embodiments, the zwitterionic precursor is

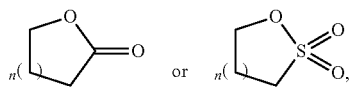

wherein n is 1, 2, or 3. In certain embodiments, the zwitterionic precursor is gaseous.

In certain embodiments, the invention relates to any one of the aforementioned methods, wherein the plasma is an oxygen plasma.

In certain embodiments, the plasma contains an initiator. The initiator may be any compound that decomposes in the plasma to form free radicals. The initiator may be AIBN, an alkyl peroxide (e.g., tert-amyl peroxide or tert-butyl peroxide), or a dialkyl peroxide (e.g., di-tert-amyl peroxide or di-tert-butyl peroxide). The initiator may be tert-amyl peroxide or tert-butyl peroxide.

In certain embodiments, the plasma contains a reagent with a functional group that can form a covalent bond with an amine group in the salt rejection layer of an RO membrane. For example, use of maleic anhydride results in the plasma brings about reaction between an anhydride moiety of maleic anhydride and an amine moiety on the surface of the RO membrane, forming an amide moiety bonded to the surface and a tethered olefin. Other reagents comprising an anhydride, an ester, or an alkyl halide could be used in a similar way (e.g., to lay down a conditioned surface comprising tethered olefins or alkynes).

In certain embodiments, the invention relates to any one of the aforementioned methods, wherein the first period of time is about 2 s to about 4 min. In certain embodiments, the invention relates to any one of the aforementioned methods, wherein the first period of time is about 2 s, about 3 s, about 4 s, about 5 s, about 6 s, about 7 s, about 8 s, about 9 s, about 10 s, about 11 s, about 12 s, about 13 s, about 14 s, about 15 s, about 16 s, about 17 s, about 18 s, about 19 s, about 20 s, about 25 s, about 30 s, about 35 s, about 40 s, about 45 s, about 50 s, about 55 s, about 60 s, about 90 s, about 120 s, about 150 s, about 3 min, about 3.5 min, or about 4 min.

In certain embodiments, the invention relates to any one of the aforementioned methods, wherein the flow rate of oxygen is about 1 sccm to about 100 sccm. In certain embodiments, the invention relates to any one of the aforementioned methods, wherein the flow rate of oxygen is about 10 sccm, about 20 sccm, about 30 sccm, about 40 sccm, about 50 sccm, about 60 sccm, about 70 sccm, about 80 sccm, about 90 sccm, or about 100 sccm.

In certain embodiments, the invention relates to any one of the aforementioned methods, wherein the first pressure is about 5 mTorr to about 1000 mTorr. In certain embodiments, the invention relates to any one of the aforementioned methods, wherein the first pressure is about 5 mTorr, about 10 mTorr, about 15 mTorr, about 20 mTorr, about 25 mTorr, about 30 mTorr, about 35 mTorr, about 40 mTorr, about 45 mTorr, about 50 mTorr, about 75 mTorr, about 100 mTorr, about 125 mTorr, about 150 mTorr, about 175 mTorr, about 200 mTorr, about 225 mTorr, about 250 mTorr, about 300 mTorr, about 350 mTorr, about 400 mTorr, about 450 mTorr, about 500 mTorr, about 550 mTorr, about 600 mTorr, about 650 mTorr, about 700 mTorr, about 750 mTorr, about 800 mTorr, about 850 mTorr, about 900 mTorr, about 950 mTorr, or about 1000 mTorr.

In certain embodiments, the invention relates to any one of the aforementioned methods, wherein the plasma is generated by applying about 50 W/cm$^2$ to about 300 W/cm$^2$. In certain embodiments, the invention relates to any one of the aforementioned methods, wherein the plasma is generated by applying about 50 W/cm$^2$, about 75/cm$^2$, about 100 W/cm$^2$, about 125 W/cm$^2$, about 150 W/cm$^2$, about 175 W/cm$^2$, about 200 W/cm$^2$, about 225 W/cm$^2$, about 250 W/cm$^2$, about 275 W/cm$^2$, or about 300 W/cm$^2$.

In certain embodiments, the invention relates to any one of the aforementioned methods, wherein the polymer is deposited onto the conditioned surface.

In certain embodiments, the invention relates to any one of the aforementioned methods, wherein depositing the polymer comprises initiated chemical vapor deposition (iCVD) of the polymer in a deposition chamber.

In certain embodiments, the invention relates to any one of the aforementioned methods, wherein the deposition rate of the polymer onto the substrate is less than about 30 nm/min. In certain embodiments, the invention relates to any one of the aforementioned methods, wherein the deposition rate of the polymer onto the substrate is about 30 nm/min, about 28 nm/min, about 26 nm/min, about 24 nm/min, about 22 nm/min, about 20 nm/min, about 18 nm/min, about 16 nm/min, about 14 nm/min, about 12 nm/min, about 10 nm/min, about 9 nm/min, about 8 nm/min, about 7 nm/min, about 6 nm/min, about 5 nm/min, about 4 nm/min, about 3 nm/min, about 2 nm/min, or about 1 nm/min.

In certain embodiments, iCVD involves a gaseous initiator. In certain embodiments, the gaseous initiator is selected from the group consisting of tert-butyl peroxide, tert-amyl peroxide, triethylamine, tert-butyl peroxy benzoate, benzophenone, and 2,2'-azobis(2-methylpropane).

Applications and Articles of the Invention

In certain embodiments, the invention relates to an article comprising any one of the aforementioned compositions.

In certain embodiments, the invention relates to any one of the aforementioned articles, wherein the article is, or is incorporated into, a water desalination device.

Methods of Use

In certain embodiments, the invention relates to a method comprising contacting, at a first flow rate, a first sample of water with any one of the aforementioned compositions or articles, thereby producing a second sample of water, wherein the first sample of water comprises a first concentration or first quantity of a substance; the second sample of water comprises a second concentration or second quantity of the substance; and the second concentration or second quantity is substantially lower than the first concentration or first quantity.

In certain embodiments, the invention relates to any one of the aforementioned methods, wherein the second concentration or second quantity is about 0.

In certain embodiments, the invention relates to any one of the aforementioned methods, wherein the method is a method of water desalination. In certain embodiments, the invention relates to any one of the aforementioned methods, wherein the substance is salt. In certain embodiments, the invention relates to any one of the aforementioned methods, wherein the substance is salt; and the second concentration is about 0 ppm, about 1 ppm, about 2 ppm, about 3 ppm, about 4 ppm, about 5 ppm, about 6 ppm, about 7 ppm, about 8 ppm, about 9 ppm, or about 10 ppm.

In certain embodiments, the invention relates to any one of the aforementioned methods, wherein the method is a method of separating oil and water. In certain embodiments, the invention relates to any one of the aforementioned methods, wherein the substance is an oil.

EXEMPLIFICATION

The invention now being generally described, it will be more readily understood by reference to the following examples, which are included merely for purposes of illustration of certain aspects and embodiments of the invention, and are not intended to limit the invention.

Example 1—Film Preparation and Derivatization

Methods All iCVD films were deposited in a custom built vacuum reactor (Sharon Vacuum), as previously described. Thermal excitations of the initiator were provided by heating a 0.5-mm Nickel/Chromium filament (80% Ni/20% Cr, Goodfellow) mounted in a parallel array and the temperature was measured by a thermocouple attached to one of the filaments. The filament holder straddled the deposition stage which was maintained at a set point temperature using water cooling. The vertical distance between the filament and the stage was 2 cm.

All the chemicals were used as purchased without further purification. Silicon (Si) wafers (Wafer World, test grade) were coated with P4VP or the copolymer of 4VP and DVB without pre-treatment. Prior to deposition, commercial RO membranes (Koch Membrane System, TFC-HR) were cleaned with filtered nitrogen, and then treated with oxygen plasma for 1 minute and then placed in the reactor chamber. The glass slides are treated with trichlorovinylsilane (Sigma-Aldrich), as described previously.

During iCVD depositions, tert-butyl peroxide (TBPO, Aldrich, 97%) initiator was fed to the reactor at room temperature through a mass flow controller (1479 MFC, MKS Instruments) at 2 sccm. 4VP (Aldrich, 95%) and DVB (Aldrich, 80%) monomers were heated up to 50° C. and 65° C. in glass jars, respectively and delivered into the reactor using mass flow controllers (1150 MFC, MKS Instruments). Argon patch flow was metered into the reactor through a mass flow controller (1479 MFC, MKS Instruments) and the flow rate was varied to keep the residence time constant. Systematic variation of the flow rate ratios of the two monomers was performed to yield high-zwitterionic-percentage, yet chlorine-resistant films of poly(4-vinylpyridine-co-divinylbenzene) (PVD). Films were deposited at a filament temperature of 250° C. and a stage temperature of 20° C. Total pressure in the vacuum chamber was maintained at 0.8 Torr for all depositions.

In situ interferometry with a 633 nm HeNe laser source (JDS Uniphase) was used to monitor the film growth and deposit desired thicknesses on Si substrates. A more accurate film thickness on the Si wafer substrates was measured post-deposition using a J. A. Woollam M-2000 spectroscopic ellipsometry at three different incidence angles (65°, 70°, 75°) using 190 wavelengths from 315 to 718 nm. The data were fit using a Cauchy-Urbach model.

After deposition, the PVD-coated substrates were fixed in a crystallizing Dish (VWR) with 1 g 1,3-propanesultone (PS, Aldrich, >99%). The crystallizing dish was placed inside a vacuum oven (Shel Lab, 1415M) which was maintained at 60 Torr, 80° C. for 6 h to let PS vapor react with the as-deposited iCVD films.

Results and Discussion

A schematic of the solvent-less fabrication of pyridine-based zwitterionic coating is shown in FIG. 1a. polydivinylbenzene (PDVB), P4VP and copolymer of 4VP and DVB are deposited via iCVD. iCVD polymerization is carried out at low vacuum and low temperature, with a thermally labile initiator and vinyl monomers co-flowing in the chamber in vapor phase and forming thin polymer coatings on the substrates with uniform thickness, namely conformally. The thermal excitations of TBPO were provided by heating filaments mounted in a parallel array, which was suspended over the deposition stage. Upon passing the filament array, the labile peroxide bond undergoes homolytic fission to generate radicals, which react with the monomers absorbed on the substrate surface and initiate free radical polymerization. The as-fabricated films are then subject to 1,3-propanesultone (PS) molecules in the vapor phase at 75° C. and the pyridine nitrogen is quaternized to obtain pyridine-based sulfobetaine.

Figure 7:
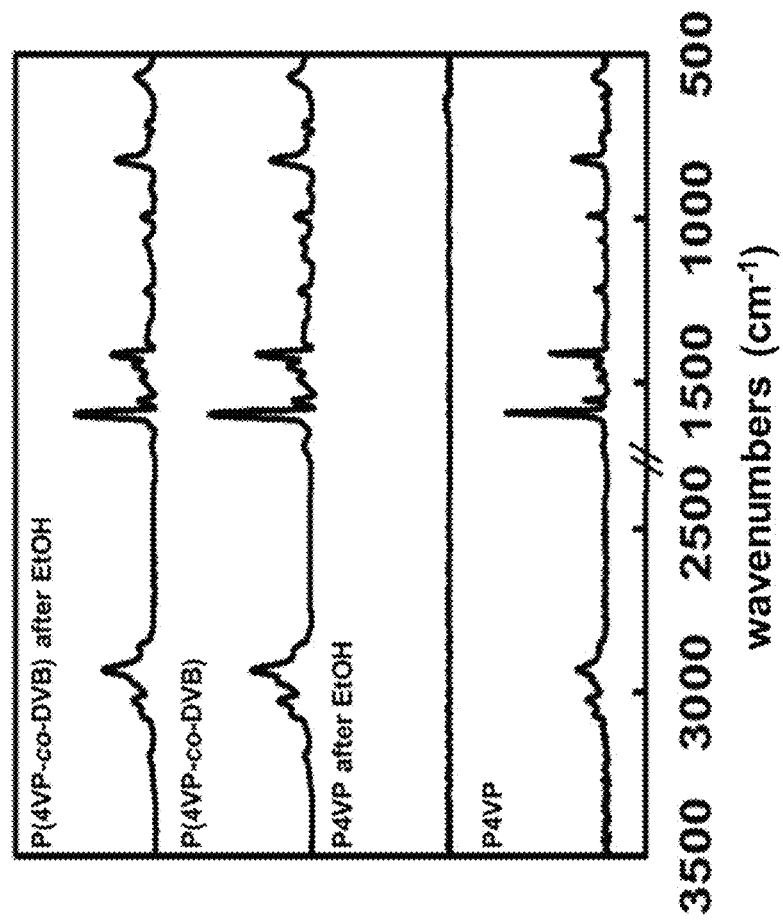
FIG. 7 depicts FTIR spectra of iCVD P4VP and P(4VP-co-DVB) before and after soaking in ethanol (EtOH). The P4VP homopolymer film is fully soluble in EtOH, as indicated by the absence of representative peaks. The spectra of the as-deposited and EtOH-soaked copolymer (P(4VP-co-DVB)) samples are virtually identical. Peaks corresponding to sp$^3$ CH$_2$ stretching in the polymer backbone are unchanged, as are peaks at 1597, 1557, 1493, 1453, and 1415 cm$^{-1}$, assigned to vibration of the pyridine rings. The lack of change observed in the spectrum of the solvent-treated sample of P(4VP-co-DVB) verifies that copolymerization has occurred.
Figure 8:
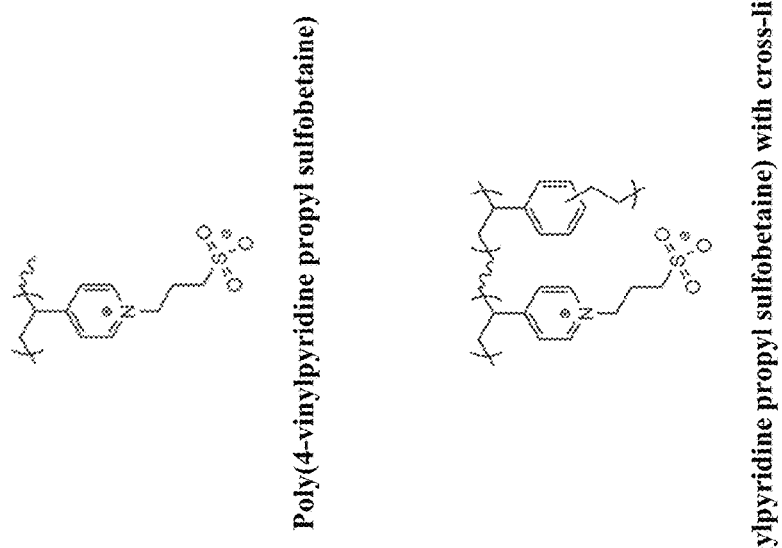
FIG. 8 depicts exemplary structures of poly(4-vinylpyridine propyl sulfobetaine) (top); and poly(4-vinylpyridine propyl sulfobetaine) with cross-linked DVB (bottom).

FTIR spectra of iCVD PDVB, P4VP and copolymers are shown in FIG. 1b. Successful polymerization of PDVB is evidenced by the reduction of the 903 $cm^{-1}$ peak in the PDVB spectrum, which results from the out-of-plane $CH_2$ deformation in vinyl groups. The existence of this peak in the homopolymer spectrum is due to the presence of unreacted pendant vinyl bonds. Excellent agreement is observed between spectra of iCVD and solution-polymerized PDVB and P4VP, indicating that the non-vinyl organic functionality in the monomer is retained in the iCVD film. This confirms that the monomer is not altered by the heated filaments during the vapor deposition process. Successful copolymerization was confirmed by comparing the FTIR spectra of films before and after the post-treatment with ethanol, which is a good solvent for P4VP (FIG. 7). The composition of the copolymers was tuned by varying the ratio of flow rates of monomers 4VP and DVB (FIG. 1c). Ar patch flow was adjusted to achieve the same residence time for each deposition by maintaining the same total flow rate. The strong peak at 1600 $cm^{-1}$ is attributed to the C—C and C—N stretching vibrations in the pyridine ring, whose intensities increase with more P4VP repeating units incorporated. Compositions of the iCVD copolymers were calculated from FTIR spectra using a method reported previously,[23] and corroborated by XPS data obtained from survey scans (FIG. 2c).

FTIR spectra were also collected during the PS functionalization process. FIG. 1d includes the spectra of as-deposited iCVD P4VP and PS-functionalized P4VP. Formation of pyridine-based sulfobetaine via ring-opening of PS is confirmed by the appearance of a peak at 1036 $cm^{-1}$, attributed to the symmetric stretching of $SO_3^-$ group. A shoulder appears on the low-wavenumber-side of the 1220 $cm^{-1}$ peak as a result of PS incorporation and corresponds to the asymmetric stretching of $SO_3^-$. Successful functionalization by PS is also confirmed by N(1s) XPS high resolution scan (FIG. 1e). Binding energy of the pyridine nitrogen species is around 399.5 eV, with a small tail on the high-binding-energy side. This can be attributed to post-treatment adsorption of atmospheric $CO_2$, which takes place in milliseconds and is inevitable. Binding energy of quaternized nitrogen is ~401.5 eV, and a symmetric peak is observed, indicating complete quaternization. Binding energies of pyridine nitrogen and zwitterionic nitrogen are in excellent consistency with reported values. This all-dry synthesis scheme enables the application of pyridine-based zwitterionic chemistry to delicate substrates such as RO membranes. The solvent-less nature renders the fabrication of coated nanostructures and even free-standing nanotubes possible.

Example 2—Film Characterization

Fourier transform infrared (FTIR) measurements were performed on a Nicolet Nexus 870 ESP spectrometer in normal transmission mode. A deuterated triglycine sulfate (DTGS) KBr detector over the range of 400-4000 cm$^{-1}$ was utilized with a 4 cm$^{-1}$ resolution. Films on Si wafers were measured immediately after deposition or post-treatment and measurements were averaged over 128 scans to improve the signal-to-noise ratio. All spectra were baseline corrected by subtracting a background spectrum of the Si wafer substrate.

An X-ray photoelectron spectroscopy (XPS) survey spectrum was obtained on a Kratos Axis Ultra spectrometer with a monochromatized Al KR source, operated at 150 Watts. The pass energy and step size for survey scans was 160 eV and 1 eV. For high-resolution scans, the pass energy and step size was 20 eV and 100 eV. Pressure during analysis was kept under 2×10$^8$ Torr. The analysis area was 400×750 μm. CasaXPS was used to fit the high-resolution spectra, with Shirley as the background. All samples were stored under vacuum overnight prior to analysis.

Hydrophilicity of coatings and bare RO membranes was evaluated by contact angle measurements performed on a goniometer equipped with an automatic dispenser (Model 500, Rame-Hart) using a 2 μL DI water droplet.

Example 3—Bacterial Adhesion Tests

Methods

*Vibrio cyclitrophicus* (*V. cyclitrophicus*) was used as the model microorganism. Flow bacterial adhesion tests were performed following the protocol reported by Stocker, R., et al. *Proceedings of the National Academy of Sciences* 2008, 105, (11), 4209-4214.

Results and Discussion

Figure 2:
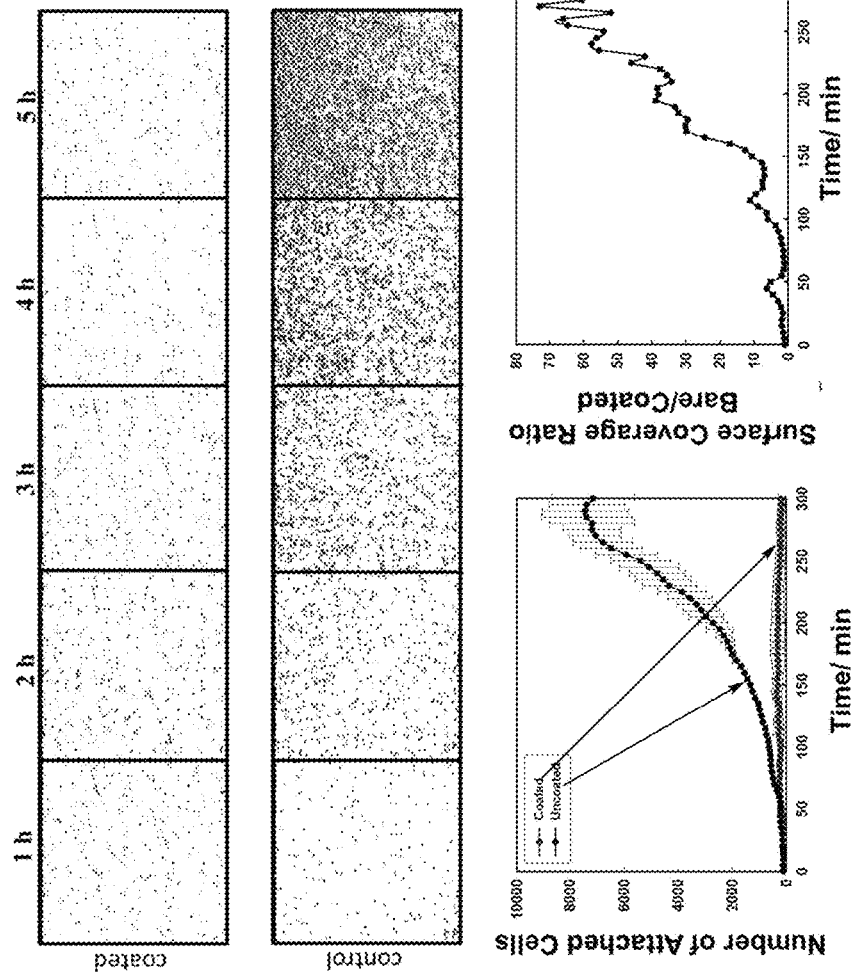
FIG. 2 depicts (a) Images of glass slides coated with iCVD zwitterionic film (upper) and bare (lower) at different times during the flow test of bacterial adhesion. After 5 hours the bare glass slide is completely covered by a biofilm, while no change in the count of bacteria is observed on the coated surface. This result confirms the excellent fouling resistance of iCVD zwitterionic coatings. (b) Comparison of bare and coated glass slides in terms of number of bacteria cells attached to the surface over the course of 5 hours. The number of cells on the bare glass saturated around 7500 after ~270 minutes, indicating complete coverage of foulant (i.e., bacteria) on the bare glass surface. The number of cells on the coated surface remained around zero throughout the test. (c) The ratio of surface areas covered by bacteria on a bare glass surface and a coated surface. The relative fouling resistance of iCVD P4VPPS surface, as indicated by this ratio, improved drastically over 5 hours, and is a factor of ~70 better for the coated surfaces compared to bare glass.

Acrylate- or methacrylate-based polybetaines have been proven to be ultralow fouling in numerous studies. However, the fouling resistance of pyridine-based zwitterionic structures has yet been reported to the best of our knowledge. Therefore, the attachment of *V. cyclitrophicus* to the iCVD P4VPPS was examined under flow conditions. *V. cyclitrophicus* is one the most prevalent marine bacteria and known to attach strongly to various surfaces. A microfluidic flow system was used to flow *V. cyclitrophicus* culture over coated and bare glass surfaces. Half of a 2-inch by 3-inch glass slide was coated with 200 nm iCVD P4VPPS (copolymer 1 after derivatization, containing 4% DVB to enhance the film stability) to illustrate the contrast in bacteria adhesion. Micron-scale channels are etched into a PDMS sheet and placed on top of the treated slide. During a test, vacuum is applied inside the channels to hold the PDMS sheet in place, and chemical bonding is required between PDMS and slide. Fresh *V. cyclitrophicus* culture was flowed through the system and the attachment on the bottom surfaces was recorded using a video camera coupled with microscope. The micrographs of the coated and bare surfaces at t=1, 2, 3, 4, and 5 hours are shown in FIG. 2. Number of cells within the field of vision on the coated surface stayed constant and the micrographs at different time points did not overlap (i.e., the spots of cells were constantly changing), implying that the cells were not attached to the coated surface; while on the bare surface, the number of cells increased over time steadily and the surface coverage reached more than 70% after 5 hours. Number of attached cells and the ratio of surface coverage of bare over coated surface are quantified and compared in FIGS. 2*b* and 2*c*. After 50 minutes, number of cells on bare glass surface started to increase exponentially and reached ~7500 after 5 hours. Surface coated with iCVD P4VPPS did not induce significant attachment and cell count on the surface stayed close to zero. Surface coverage ratio is calculated by dividing the percent of area covered by bacteria on the bare surface by that on the coated surface. The relative fouling resistance of iCVD P4VPPS surface, as indicated by this ratio, improved drastically over 5 hours and is a factor of ~70 better for the coated surfaces compared to bare glass. These results prove, for the first time, that pyridine-based sulfobetaine chemistry is able to resist bacteria attachment effectively.

The fouling resistance of zwitterionic chemistries has been attributed to the extreme hydrophilicity of such film, which results from the strong electrostatic interactions between the surface charges and ambient water molecules. During the settlement of foulants, the strongly surface-bounded water molecules have to be replaced, which is enthalpically unfavorable and thus unlikely. We hypothesize that the excellent resistance to bacteria attachment of iCVD P4VPPS surfaces is also due to the electrostatic interaction given the structural similarity.

Prolonged flow experiments up to 9 days have been conducted on methacrylate-based polysulfobetaines and the fouling resistance of such surfaces is a factor of ~100 better than bare glasses.

Example 4—Application on RO Membranes

Commercial reverse osmosis (RO) membranes were coated with copolymers and homopolymers, and functionalized with PS. Thickness of the coatings on RO membranes was controlled in situ with an interferometer monitoring the film thickness on the Si wafer, which was measured more precisely afterwards with a variable angle spectroscopic ellipsometer. The thickness on Si has been shown to represent that on RO membranes in iCVD system. Thinner coatings are desirable based on solution-diffusion mechanism of water transportation through RO membranes. Therefore, coatings with the thickness of 30 nm were deposited to maximize the permeability of the modified membranes. Copolymer 1 was applied to RO membranes for the salt rejection tests because it has the best fouling resistance and gives the highest permeability among all the copolymers, as shown in the following section. This is likely due to its greatest hydrophilicity resulted from the high concentration of zwitterionic moieties.

Example 5—Chlorine Resistance Tests

Methods

Samples subject to chlorine resistance tests were soaked in DI water for 2 hours, blown with nitrogen gas to dry, and then soaked in aqueous solution of sodium hypochlorite with the concentration of 1,000 ppm for various treatment lengths. FTIR spectra and dynamic contact angle measurements were taken before and after DI soaking, as well as before and after treating with chlorine solutions.

Results and Discussion

Disinfection of feed water to membrane desalination unites is required to reduce membrane biofouling. However, polyamide RO membranes suffer from poor resistance to continual exposure to oxidizing agents such as chlorine. Membrane performance degraded significantly during continuous exposure to water containing a few ppb chlorine.

Zwitterionic coatings have been shown to be stable when stored in ambient lab environment. However, strenuous stability tests have not been conducted on zwitterionic coatings to the best of our knowledge. In addition, current zwitterionic coatings are fabricated almost exclusively with acrylate or methacrylate monomers, which are susceptible to oxidative degradation by chlorine or UV. Here, we chose 4VP and DVB as the precursor to eliminate ether or ester bonds, in hope of rendering the coating stable in bleach, and thus can reduce the operational cost in seawater desalination effectively.

Homopolymer P4VP and copolymer 1 (4% DVB) were functionalized and treated with 1000 ppm sodium hypochlorite solution for 2, 10 and 24 hours (i.e., 2,000, 10,000, and 24,000 ppm h, respectively); FTIR spectra and dynamic contact angles (DCA) were collected and compared (FIG. 4). The as-fabricated coatings were soaked in de-ionized (DI) water for 2 hours before the chlorine treatment to remove the surface-absorbed PS molecules. The all peak intensities in the P4VP spectrum decreased after 2,000 ppm h chlorine treatment, indicating the removal of P4VP; after 24,000 ppm h treatment, the functionalized P4VP film disappeared and no peaks remained on the spectrum. FTIR spectra were also collected during chlorine treatment of the copolymer (FIG. 4b). Excellent agreement was observed among the FTIR spectra before, after 2,000 ppm h and 24,000 ppm h chlorine treatment, confirming the exceptional chlorine resistance of the iCVD zwitterionic copolymer with merely 4% cross-linker content.

Commercial RO membranes were treated with 1,000 ppm chlorine for comparison with iCVD coatings. 1000 ppm chlorine was added to the feed with 2000 NaCl, and the salt rejection was monitored over 24 hours (FIG. 4c). Salt rejection decreased to less than 60% after 10 hours, and to ~30% at the end of 24 hours, indicating the poor resistance to chlorine oxidation damage. For iCVD coatings, areas under the 1600 cm$^{-1}$ peak (corresponds to the pyridine ring) in all spectra were quantified and plotted in FIG. 3d. Functionalized P4VP does not resist chlorine effectively; ~67% of the functionalities remained after 2 hours in 1,000 ppm chlorine solution, and all functionalities are gone after 10,000 ppm h exposure. The addition of 4% DVB increases the resistance significantly. After 10,000 ppm h exposure, ~94% functionalities remained and this increases to 99% if 17% DVB is added to the copolymer. Therefore, the addition of cross-linker DVB greatly enhanced the resistance to oxidation damage by sodium hypochlorite and the chlorine resistance of iCVD zwitterionic copolymers is significantly better than commercial RO membranes.

The functionalized P4VP and copolymer 1 samples before and after chlorine treatment were also characterized by dynamic contact angle (DCA) measurements, which were conducted using the sessile drop technique. Advancing and receding contact angles of P4VP homopolymer before chlorine treatment are ~31° and 200 respectively (FIG. 5a), which become ~48° and 18° after only 2,000 ppm h chlorine treatment. No film remained after 24,000 ppm h treatment and DCA was thus not collected. The change in DCA is due to the degradation by hypochlorite. Chlorine treatment and DCA measurements was conducted on functionalized copolymer 1 as well (FIG. 5b). The DCA remain unchanged even after 24,000 ppm h chlorine treatment. The advancing and receding contact angles are ~51° and ~24° for all copolymer 1 samples. Incorporation of DVB in copolymer 1 renders advancing contact angle 20° higher than P4VP. However, the receding contact angle of copolymer 1 is comparable to P4VP. This indicates possible chain reorganization upon contacting water, which has been observed previously for lightly-cross-linked copolymer with hydrophilic segments.[17] Surface chain reorganization refers to the migration of hydrophilic segments toward the surface when the surface is submerged in water, which is driven by thermodynamic driving force to minimize the interfacial free energy. It is worth noting that the surface chain reorganization ensures high concentration of zwitterionic moieties on the surface, precisely where the antifouling properties are exploited.

Example 6—Permeation Tests

Methods

The permeation tests of the coated/bare membranes were performed using a commercial cross-flow membrane filtration unit (Sterlitech Corp., Sepa CF II) with a Hydracell Pump (M-03S) with DI water at 25° C. The feed pressure was adjusted using a pressure control valve and a secondary metered valve. The flowrates of the feed were monitored by a vortex shedding flowmeter (FV101, Omega Engineering Inc.). The temperature of the feed was kept constant using a NESLAB chiller. The flowrates of the permeates were determined using a 100 mL metered flask. For the salt rejection calculations, a conductivity meter (CDH-152, Omega Engineering Inc.) was used.

Results and Discussion

Permeation tests were performed on bare membranes and RO membranes coated with homopolymers P4VP and DVB as well as copolymers with various compositions. As-deposited membranes were subject to functionalization with PS and stored in DI water until permeation tests. A cross-flow permeation cell was used and feed pressure was kept at ~300 psi for all tests. Permeability of bare membranes is ~90 L/h/m$^2$; and permeability of coated membranes is normalized by the bare-membrane permeability for comparison (FIG. 3a). Permeability of membranes coated with P4VP and copolymer 1 (4% DVB) is comparable to that of bare membranes with ~24% and 14% decrease respectively resulted from 30 nm iCVD coating. It is worth noting that the 4% DVB in copolymer 1 does not render the coating less permeable than homopolymer P4VP, indicating that the light cross-linking did not reduce the pore size or render the coating more hydrophobic significantly. This corroborates the similarity in receding contact angles between P4VP and copolymer 1. However, if the content of DVB is increased to 17% (copolymer 2), 72% decreased in permeability was observed; while homopolymer PDVB gives rise to 84% decrease in permeability. This drastic decrease in permeability is likely due to the high cross-linking density.

Salt rejection of the bare and coated membranes was measured to evaluate the effects of processing on RO membrane substrates. RO membranes have been known to be very delicate and mild treatments such as ethanol soaking can increase the defect size to 8-10 folds in 5 minutes. Surface modification on RO without jeopardizing membrane performance creates great challenge for traditional methods such as self-assembled monolayers (SAMs) and atom transfer radical polymerization (ATRP).

Feed contained 2000 ppm NaCl and 300 psi was applied to the feed side. Conductivities of the feed and permeate were measured every 2 minutes for 4 hours and salt rejection was calculated as:

$$r = \left(1 - \frac{Cond_{permeate}}{Cond_{feed}}\right) \times 100\%$$

Salt rejection of bare membranes is around 92% (FIG. 3b). Membranes coated with functionalized copolymer 1 have similar rejection (93%), indicating iCVD processing does not introduce defects and leaves the membrane performance intact while rendering them fouling-resistant.

Example 7—Additional Bacterial Adhesion Tests

Bacteria cells from freezer stocks were inoculated and grown overnight in artificial seawater at 30° C. to an optical density ($OD_{600}$) of 1 while agitated on a shaker (150 rpm). Cells were suspended in fresh artificial seawater and incubated at 37° C. on a shaker (180 rpm) until the optical density reached 0.2. The bacterial solution was then injected into the microfluidic channels at a constant flow rate of 2 µl $min^{-1}$, which corresponds to an average flow velocity of 560 µm $s^{-1}$. During the combination treatment, chlorine was directly added to the vessel containing the media with bacteria to a final concentration of 5 ppm. Note that in this case the images (FIG. 10) acquired at a certain time (t hours) captured bacteria that have been exposed to chlorine for t h.

Example 8—Broad-Spectrum Fouling Resistance

To verify the broad-spectrum fouling resistance of pyridine-based zwitterionic coatings, it is not possible the carry out the accelerated fouling test with high concentrations of foulants of interest for all the fouling species in the ocean. Therefore, a reductionist approach was adopted. AFM tips were functionalized with specific moieties, whose molecular interactions with the surface are quantified with molecular force probe (MFP). Four types of AFM tips were used in this study. The AFM tips functionalized with carboxylic groups represent natural organic matter, such as humic acid, an important foulant in water purification. The AFM tips functionalized with amine groups represent protein, whose attractive force measured by MFP correlates very well with the model protein bovine serum albumin (BSA), demonstrating the validity of using MFP to quantify surface fouling. The AFM tips functionalized with methyl groups represent organic compounds, such as hydrocarbons. The iCVD pyridine-based zwitterionic thin films demonstrated attractive forces close to zero for all four types of AFM tips (FIG. 16).

The attractive force between the iCVD zwitterionic surface and a functionalized tip was compared to that for gold and polydimethylsiloxane surfaces. iCVD zwitterionic surface has the lowest attractive force among the three surfaces for all four types of AFM tips, representing good resistance to a vast diversity of fouling species.

The antifouling properties were also measured under high-salinity conditions, to prove that the iCVD zwitterionic surface can be very useful in the purification of produced water generated during hydraulic fracturing as well (FIG. 17). The attractive force was measured in phosphate buffered saline (PBS) solution and PBS solution with the addition of 2 M sodium chloride to increase salinity to a level that is comparable to produced water. The attractive force remain unchanged for the iCVD zwitterionic surface (denoted as PVD1) with the unusual high salinity. Therefore, the pyridine-based iCVD zwitterionic coating has great potential as a blanket coating that can be applied to all membranes and devices used in produced water purification.

Example 9—Underwater Oil Repellency

The low water contact angle and small contact angle hysteresis of the coatings make it an excellent functional material for various applications including underwater oil-repellent surfaces and bubble-releasing coatings.

FIG. 18 demonstrates the underwater dynamic contact angles of various surfaces in comparison to the zwitterion-modified surface. The zwitterionic surface has the highest advancing and receding contact angles, with zero hysteresis, which makes it a slippery surface underwater.

The coatings were also applied to rough surfaces with surface structures on micro- and nano-scales. The advancing and receding underwater contact angles of mineral oil are close to 180° on such surfaces, which are very difficult to measure accurately. The super-oleophobicity is therefore demonstrated by a series of images taken when a droplet of mineral oil approaches the surface, makes contact with the surface, and then leaves the surface as shown in FIG. 19. The oil droplet slides while maintaining the round shape with ~180° contact angle, instead of wetting the surface, when the surface is pressed against it, demonstrating the exceptional oleophobicity of the pyridine-based zwitterionic coatings when they are combined with surface structures.

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A composition, comprising a substrate and a coating material; wherein the coating material is on a surface of the substrate; wherein the substrate is a reverse osmosis membrane; and the coating material comprises a polymer comprising a plurality of first repeat units and a plurality of second repeat units; wherein
the first repeat unit is

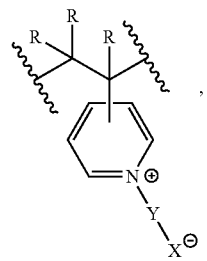

wherein, independently for each occurrence,

R is H, an alkyl, a halo, a hydroxy, an amino, a nitro, or a cyano;

Y is a linker that does not comprise an amide bond, an ester bond, or an ether bond; and $X^{\ominus}$ is —$SO_3^{\ominus}$, —$HPO_3^{\ominus}$, or —$CO_2^{\ominus}$;

the second repeat unit is

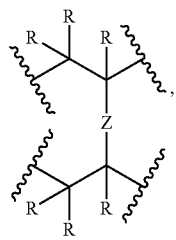

wherein, independently for each occurrence,
R is H, an alkyl, a halo, a hydroxy, an amino, a nitro, or a cyano; and
Z is a linker that does not comprise an amide bond, an ester bond, or an ether bond.

2. The composition of claim 1, wherein the thickness of the coating material is from about 10 nm to about 1500 nm.

3. The composition of claim 1, wherein the substrate comprises a polysulfone, a polyimide, or a polyamide.

4. The composition of claim 1, wherein the permeability of the composition is about 50%, about 55%, about 60%, about 65%, about 70%, about 75%, about 80%, about 85%, about 90%, about 95%, or about 99% of the permeability of the substrate alone, without the coating material, under identical conditions.

5. The composition of claim 1, wherein the composition rejects about 70%, about 75%, about 80%, about 85%, about 90%, about 95%, or about 99% of the salt in a feed solution as compared to the substrate alone, without the coating material, under identical conditions.

6. The composition of claim 1, wherein the first repeat unit is

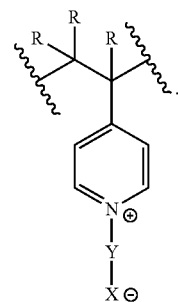

7. The composition of claim 1, wherein R is H or an alkyl.
8. The composition of claim 1, wherein Y is an alkylene.
9. The composition of claim 1, wherein X is $-SO_3^{\ominus}$.
10. The composition of claim 1, wherein Z is an arylene or an alkylene.
11. An article comprising a composition of claim 1, wherein the article is a component of a water desalination device.

* * * * *